United States Patent [19]

Röschert et al.

[11] Patent Number: 5,644,016

[45] Date of Patent: Jul. 1, 1997

[54] MALEIMIDE COPOLYMER AS ALIGNMENT LAYER FOR LIQUID-CRYSTAL DISPLAYS

[76] Inventors: Horst Röschert; Norbert Rösch; Peter Wegener, all of Hoechst Aktiengelsellschaft, D-65926 Frankfurt am Main, Germany

[21] Appl. No.: 295,729

[22] PCT Filed: Mar. 26, 1993

[86] PCT No.: PCT/EP93/00740

§ 371 Date: Nov. 17, 1994

§ 102(e) Date: Nov. 17, 1994

[87] PCT Pub. No.: WO93/21556

PCT Pub. Date: Oct. 28, 1993

[30] Foreign Application Priority Data

Apr. 17, 1992 [DE] Germany ............... 42 12 893.5
Sep. 2, 1992 [DE] Germany ............... 42 29 194.1

[51] Int. Cl.$^6$ ............... C08G 73/12; G02F 1/1337
[52] U.S. Cl. ............... 528/170; 528/310; 528/322; 528/350; 528/353; 428/1; 428/473.5; 525/326.7; 525/327.4; 349/123
[58] Field of Search ............... 528/170, 310, 528/322, 350, 353; 428/1, 473.5; 359/36, 75; 525/326.7, 327.4

[56] References Cited

U.S. PATENT DOCUMENTS 4,478,727 10/1984 Turner et al. ............... 525/327.5
4,540,762 9/1985 Turner ............... 526/262
4,847,327 7/1989 Rupp et al. ............... 525/326.7

FOREIGN PATENT DOCUMENTS 0324547 7/1989 European Pat. Off. .
0351718 1/1990 European Pat. Off. .
WO89/05996 6/1989 WIPO .

OTHER PUBLICATIONS

Liquid Crystals, Applications and Uses, vol. 1, edited by B. Bahadur (Oct. 1991), pp. 183–185.

*Primary Examiner*—Samuel A. Acquah
*Assistant Examiner*—P. Hampton-Hightower

[57] ABSTRACT

Use of a polymer containing maleimide units of the formula I

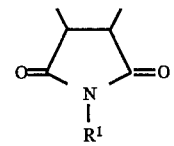

in which

R$^1$ is hydrogen, an acyclic or cyclic, aliphatic, aromatic or araliphatic radical which is chiral or achiral, can be monosubstituted or polysubstituted by functional groups and in which one or more CH$_2$ groups can be replaced by functional groups, as alignment layer in liquid-crystal displays.

Alignment layers containing a polymer conforming to the formula I effect, in particular, a suppression of twist states and ghost images and thus an improvement in the optical contrast.

10 Claims, No Drawings

MALEIMIDE COPOLYMER AS ALIGNMENT LAYER FOR LIQUID-CRYSTAL DISPLAYS

BACKGROUND OF THE INVENTION

Switching and display devices containing ferroelectric liquid-crystal mixtures (FLC displays) are disclosed, for example, in EP-B 0 032 362 (U.S. Pat. No. 4,367,924). Liquid-crystal displays are devices which, as a consequence of electrical switching, modify their optical transmission properties in such a way that incident (and possibly re-reflected) light is modulated in intensity. Examples are the known watch and calculator displays or liquid-crystal displays in the OA (office automation) or TV sectors (see also Liquid Crystal Device Handbook, Nikkan Kogyo Shimbun, Tokyo, 1989; ISBN 4-526-02590-9C 3054 and the papers cited therein).

These FLC displays are constructed in such a way that a ferroelectric liquid-crystal layer is enclosed on both sides by layers which are usually, in this sequence starting from the FLC layer, at least one alignment layer, electrodes and a limiting plate (for example made of glass). In addition, they contain one polarizer if they are operated in guest-host or reflective mode or two polarizers if the transmissive birefringence mode is used. The switching and display elements may contain further auxiliary layers, such as diffusion barrier or insulation layers.

The alignment layers, which comprise an organic (for example polyimide, polyamide and polyvinyl alcohol) or inorganic (for example SiO) material, together with a separation between the limiting plates which is chosen to be sufficiently small, bring the FLC molecules of the mixture into a configuration in which the molecules lie with their long axes parallel to one another and the smectic planes are arranged perpendicular or inclined to the alignment layer. In this arrangement, the molecules, as is known, have two equivalent orientations, between which they can be switched by pulse-like application of an electric field, i.e. FLC displays are capable of bistable switching. Response times are inversely proportional to the spontaneous polarization of the FLC mixture and are in the region of microseconds.

Surprisingly, it has now been found that polymers containing maleimide monomer units can advantageously be employed as alignment layers in liquid-crystal displays, in particular ferroelectric displays.

Polymers of this type have hitherto been employed as binders in photoresist materials, as described, for example, in U.S. Pat. No. 720,445, EP 0 140 273 and EP 0 234 327. However, their use as an alignment layer in LC displays, in particular FLC displays, has not previously been described.

SUMMARY OF THE INVENTION

The invention thus relates to the use of a polymer containing maleimide units of the formula I

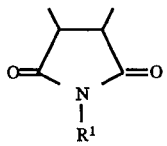

I in which
R$^1$ is hydrogen, an acyclic or cyclic, aliphatic, aromatic or araliphatic radical which is chiral or achiral, can be monosubstituted or polysubstituted by functional groups and in which one or more CH$_2$ groups can be replaced by functional groups, as an alignment layer in liquid-crystal displays, preferably in ferroelectric liquid-crystal displays.

DESCRIPTION OF THE PREFERRED EMBODIMENTS

R$^1$ is preferably hydrogen, an aromatic, aliphatic or araliphatic ring having 6 to 24 carbon atoms or a branched or unbranched aliphatic radical having 1 to 40 carbon atoms, which may also contain chiral centers and in which one or more hydrogen atoms, independently of one another, may be replaced by —OH, —F, —Cl, —Br, —CN, —NR$^2$R$^3$, —COOR$^2$, —OR$^2$, —OSi(CH$_3$)$_3$, —SiR$^2{}_2$R$^3$, —Si(OR$^2$)$_2$R$^3$, —Si(OR$^2$)$_2$(OR$^3$) or —OOC—NR$^2$R$^3$, where R$^2$ and R$^3$, independently of one another, are hydrogen or an alkyl radical having 1 to 6 carbon atoms, and in which one or more CH$_2$ groups may be replaced by —O—, —SO$_2$—, —CO—, —CONR$^2$—, —HC=CH— or —C≡C—.

R$^1$ is particularly preferably hydrogen, a branched or unbranched alkyl radical having 1 to 20 carbon atoms in which one CH$_2$ group may be replaced by —O— or —CO—, and in which one or more hydrogen atoms may be replaced by fluorine, or is —CH(CH$_3$)—CH$_2$—(O—CH$_2$—CH$_2$—)$_n$X, —CH$_2$—CH$_2$—(O—CH$_2$—CH$_2$)$_n$X, —CH$_2$(CH$_3$)—CH$_2$—(O—CH$_2$—CH(CH$_3$)—)$_n$X or —CH$_2$—CH$_2$(O—CH$_2$—CH(CH$_3$)—)$_n$X, where n=1 to 10 and X=—NH$_2$ or —OH, or the

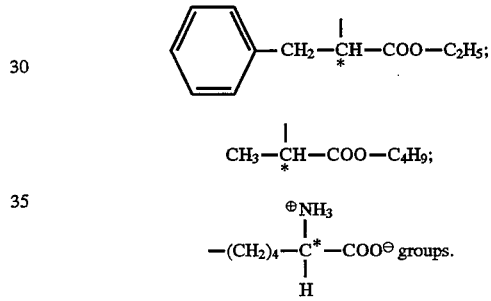

The maleimide units of the formula I are preferably in the main chain.

The polymer to be employed according to the invention can comprise, as a homopolymer, only maleimide units of the formula I having identical R$^1$ radicals or, as a copolymer or higher polymer, maleimide units of the formula I containing different radicals R$^1$ or maleimide units of the formula I and units derived from polymerizable, ethylenically unsaturated compounds of the formula II

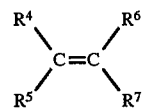

II in which
R$^4$ to R$^7$ are hydrogen, or aliphatic and/or aromatic radicals, which can be monosubstituted or polysubstituted by functional groups.

R$^4$ to R$^7$ are preferably hydrogen, an aromatic radical having 6 to 10 carbon atoms or a branched or unbranched alkyl group having 1 to 10 carbon atoms, in which one or more non-adjacent CH$_2$ groups may be replaced by —O—, —OOC—, —COO—, —Si(CH$_3$)$_2$— or —O—CO—NR$^8$, or are —OH, —Cl, —Br, —NO$_2$, —CN, —COOR$^9$, —OR$^{10}$, —O—Si(CH$_3$)$_3$ or —O—CONR$^{11}$R$^{12}$, where R$^8$, R$^9$, R$^{10}$, R$^{11}$ and R$^{12}$ are hydrogen or an alkyl radical having from 1 to 5 carbon atoms.

Particularly preferred olefinic monomers of the formula II are styrenes, vinyl and allyl ethers, vinyl and allyl esters, vinyl- or allyltrimethylsilane, acrylonitrile, cinnamic esters and cinnamonitrile, acrylic and methacrylic esters, acrylamides, methacrylamides and vinylnaphthalenes.

Particularly preferred olefinic monomers are styrenes of the formula III and/or vinyl ethers/esters of the formula IV

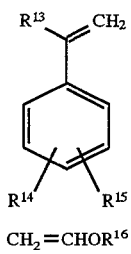

$CH_2=CHOR^{16}$     IV in which $R^{13}$ is hydrogen or methyl, and $R^{14}$ and $R^{15}$ are hydrogen, acyl having 1 to 5 carbon atoms, —OH, —Cl, —Br, —F, —CN, —$NO_2$, —$NR^{17}R^{18}$, —$COOR^{19}$, —OOC—$R^{20}$ or —O—$COOR^{21}$, where $R^{17}$, $R^{18}$, $R^{19}$, $R^{20}$ and $R^{21}$ are hydrogen or an alkyl radical having 1 to 5 carbon atoms, in which one or more hydrogen atoms may be substituted by —OH, —Cl, —Br, —F, —CN or —$NO_2$, and $R^{16}$ is alkyl having 1 to 30 carbon atoms, in which one or more H atoms may be substituted by —OH, —Cl, —Br, —F, —CN or —$NO_2$, acyl having 1 to 5 carbon atoms or an aromatic group having 6 to 10 carbon atoms.

Polymers comprising units of the formulae I and II contain at least 5%, preferably from 25 to 75%, particularly preferably from 40 to 60%, of maleimide units of the formula I.

The polymers to be employed according to the invention are particularly advantageously copolymers or terpolymers comprising 50% of maleimide units of the formula I and a total of 50% of units of a styrene of the formula III and/or units of a vinyl ether of the formula IV, where $R^1$ is hydrogen, —$CH_2OH$ or —$C_6H_4$—OH, $R^{10}$ and $R^{11}$ are hydrogen, $R^{12}$ is hydrogen or $C_1$-$C_6$-alkyl, and $R^{13}$ is $C_6$-$C_{24}$-alkyl. The ratio between the number of units of the formulae III and IV is preferably from 100:0 to 0:100, particularly preferably from 100:0 to 50:50.

It is particularly advantageous to employ a polymer of the formula V below, molecular weight is determined by GPC (gel permeation chromatography).

The polymer can be prepared in a manner known per se by free-radical polymerization using AIBN or DBPO as free-radical initiator, in concentrations of from 1 to 5 mol %.

It is possible to vary the radical $R^1$ on the imide nitrogen in various ways. For example, it is possible, as described above, to start from monomers which already contain the desired radical $R^1$.

It is also possible subsequently to modify the maleimide component in the copolymers and terpolymers listed here. This can be effected, for example, by deprotonating the imide (if $R^1$=H) by means of a suitable base and subsequently reacting the product with an acyl halide. This type of reaction is known per se and described, for example, in Organikum, 15th Edn., p. 257, VEB Dt. Vlg. d. Wissenschaften, Berlin, 1981. During the reaction of the deprotonated imide with acyl halides, rearrangement reactions can occur, in particular under the conditions for the production of the alignment layer, so that the structure of the novel compound in the finished liquid-crystal cell need not necessarily be identical to the primary product of the above reaction.

The imide component can furthermore be modified under the conditions of the Mitsunobu reaction (O. Mitsunobu, Synthesis, 1981, 1). In this reaction, a novel maleimide copolymer is reacted with an alcohol in the presence of stoichiometric amounts of triphenylphosphine and diethyl azodicarboxylate with elimination of water. If optically active alcohols are used, the chirality is retained during the reaction, so that chirally modified alignment layers are obtained in this way.

It is also possible subsequently to introduce the maleimide component claimed into the copolymer or terpolymer mentioned here by starting from a copolymer or terpolymer containing a maleic anhydride in place of maleimide. This polymer can then, in a second step, be converted into the maleimide copolymer claimed here in a known manner (Houben-Weyl, Vol. 8/p. 657, G. Thieme Verlag, 1952) by reaction with ammonia or primary amines ($R_1$—$NH_2$) with removal of the water liberated during the reaction. In this case, it is unnecessary to achieve complete conversion of the maleic anhydride units into maleimide units, since a residual content of maleic anhydride in the polymer does not interfere. However, it is advantageous to convert at least 30%, preferably 50%, of the anhydride groups.

It is furthermore possible to start from a commercially available copolymer comprising only maleic anhydride and compounds of the formula II and, after application, to convert the resultant alignment layer into maleimide units

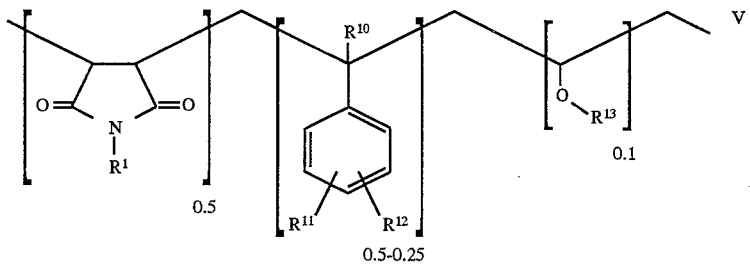

The polymers to be employed according to the invention, in particular of the formula V, can have a molecular weight ($M_w$) of from 3000 to 300,000, preferably from 5000 to 100,000, particularly preferably from 10,000 to 50,000. The only at the surface by reaction with a primary amine. In this case, it is also possible to carry out the imidation using diamines, preferably relatively long-chain and/or terminal diamines, which result in crosslinking or loop formation.

It is furthermore possible to use chiral compounds, for example amino acid esters, where the chirality is also retained in this procedure. Chiral alignment layers of this type enable a particularly high degree of order to be obtained. If the surface modification is carried out using amines which contain at least one further amino group and a carboxyl, sulfonyl or phosphonyl group and which therefore form zwitterions, ionically modified alignment layers are obtained. Examples of such compounds are lysine, arginine, α-, β-diaminobutyric acid, ornithine, hydroxylysine and/or citrulline.

All the mono-, di- or polyamino compounds mentioned can be employed individually or as a mixture.

Use may be made according to the invention of homopolymers which comprise only maleimide units of the formula I containing identical $R^1$ radicals or of copolymers and higher polymers comprising maleimide units of the formula I containing different radicals $R^1$ or comprising maleimide units of the formula I and units derived from polymerizable, ethylenically unsaturated compounds of the formula II, which are described above.

The invention furthermore relates to a polymer containing maleimide units of the formula I which has been rendered amphiphilic, and to the use thereof as alignment layer in liquid-crystal displays, preferably in ferroelectric liquid-crystal displays.

Polymers which have been rendered amphiphilic are prepared by applying or linking by covalent bond compounds, for example, of the coronand, cryptand or podand type. The polymer which has been rendered amphiphilic can be employed as alignment layer and results in significantly increased contrast in FLC displays and in greater image brightness.

The substances causing the amphiphilicity can either be chemically bonded to the alignment layer or applied simply as a strongly or weakly physisorbed coating.

The display component causing the amphiphilicity of the alignment layer can thus be applied as an additional layer between the alignment layer and the FLC layer or added to the material of the alignment layer as a simple mixture component. A further possibility comprises coupling the substance to the material of the alignment layer by chemical reaction.

The effective intermediate layer can be applied, for example, from a solution of suitable compounds in acetone, toluene, cyclohexanone, isopropanol, N-methylpyrrolidone, dioxane or the like by printing, dipping, spraying and spin-coating methods or the like. Also suitable are vacuum deposition methods, such as simple vapor deposition or reactive vapor-deposition methods (for example chemical vapor deposition (CVD)).

The effective intermediate layer can be applied during various steps in the FLC display production process, for example directly after the curing or drying of the alignment layer, before the rubbing step or immediately before the bonding of the cell. The substances or substance mixtures can likewise be applied to the wet alignment layer film and cured, i.e. heated, simultaneously with the alignment layer.

It is also advantageous to mix the active substances or substance mixtures with the polymer or polymer precursor solution prepared for the production of the alignment layer and then to apply them together with the latter in one step.

The active compounds can in principle be either monomeric, oligomeric or polymeric compounds. In general, they have a moderate to strong lipophilic character with low polarity, or are distinguished by the fact that the compound has separately localized regions of relatively high and low polarity/hydrophilicity. Cyclic compounds can also have an exosphere having a rather lipophilic nature and an endosphere having a rather hydrophilic nature.

It is furthermore preferred, in LC displays containing the novel alignment layer, to use insulation layers in order to avoid short circuits, where the layer sequence is (1) glass, (2) ITO electrode, (3) insulation layer, (4) alignment layer, if desired with additive admixed or chemically or physically bonded to the surface.

In order to suppress the surface memory effect, it may be advantageous for the electrical capacitance of the insulation and alignment layers to be as high as possible (in this respect, cf. C. Escher, H. -R. Dübal, T. Harada, G. Illian, M. Murakami and D. Ohlendorf, 2nd Int., Symp. on FLC, Gothenburg, 1989, Ferroelectrics 113 (1991) 269.

For adequate insulation capacity, the thickness of the insulation layer should be at least from 50 to 100 nm. In order to achieve sufficiently high capacitances at this layer thickness, insulation layers having high dielectric constants, such as $Ta_2O_5$ and $TiO_2$, must be used (see also JP-A 61/170 726, JP-A 61/078 235, Y. Inabe, K. Katagiri, H. Inone, J. Kanbe, S. Yoshihara and S. Iijima, Ferroelectrics (1988), 85, pp. 255 to 264).

Particularly suitable compounds which render the alignment layer emphiphilic are macrocyclic compounds, cryptands, coronands, podands, mercapto compounds and ionophoric compounds.

Macrocyclic compounds to be employed according to the invention are described in EP-A-0 451 822 and are reproduced here by means of the formula VI

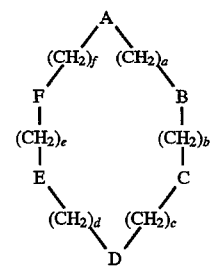

where a, b, c, d, e and f, independently of one another, are integers from zero to 4, where a+b+c+d+e+f is ≧7, and -A-, -B-, -C-, -D-, -E- and -F- are identical or different and are

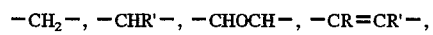

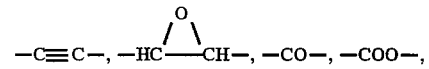

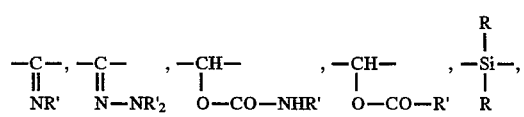

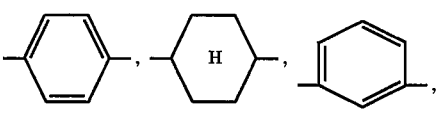

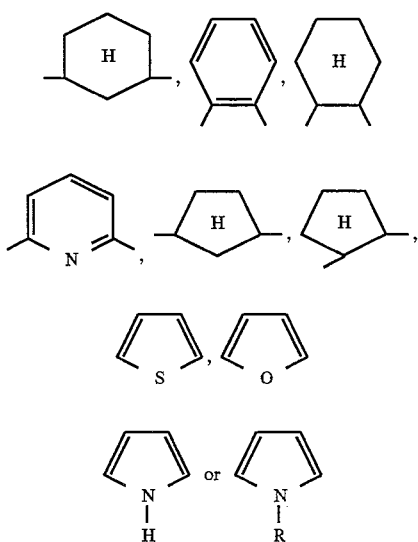

where

R is alkyl having 1 to 12 carbon atoms, and

R' is alkyl having 1 to 12 carbon atoms in which one —CH$_2$— group may be replaced by —O— or —CO O—, or is phenyl or Cl, F or CN.

Cryptands and coronands, as proposed in DE-A 4 011 803, are likewise particularly suitable as compounds providing a amphiphilic effect.

For a classification of said complex ligands, reference is made to E. Weber and F. Vögtle, Inorganica Chimica Acta, Vol. 45, (1989), L65–L67. The ligand topo-logies listed therein are reproduced below:

open-chain

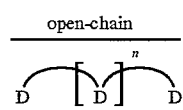

Podand
D: Donor

Cyclic

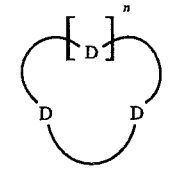

Coronand
D = O: Crown ether atom

-continued
spherical

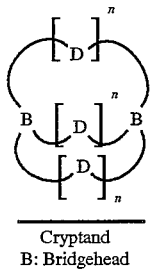

Cryptand
B: Bridgehead

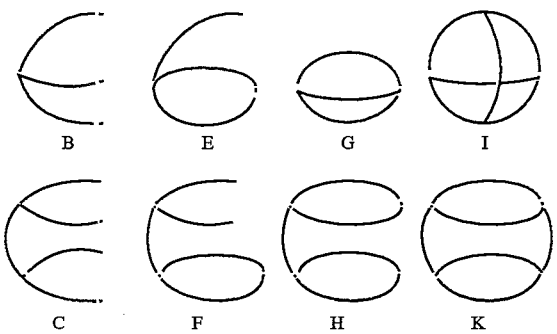

The cryptands or coronands to be employed can be represented by the formula VII or VIII:

$$\begin{array}{c} CH_2(-CH_2-Z-CH_2)_m-CH_2 \\ | \quad\quad\quad\quad\quad\quad\quad\quad | \\ X^1 \quad\quad\quad\quad\quad\quad\quad\quad X^2 \\ | \quad\quad\quad\quad\quad\quad\quad\quad | \\ CH_2(-CH_2-Z-CH_2)_n-CH_2 \end{array} \quad\quad VII$$

where

Z is —O— or —S—, m and n are integers greater than zero, where m+n=2 to 6,

—X$^1$— and —X$^2$— are identical or different and are

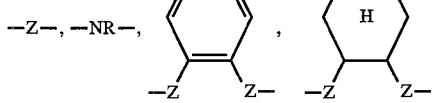

or

—X$^1$— and —X$^2$— together are
>N—CH$_2$(—CH$_2$—Z—CH$_2$)$_r$—CH$_2$—N< or
>N—CO(—CH$_2$—Z—CH$_2$)$_r$—CO—N< where

—R is alkyl or alkanoyl having 1 to 15 carbon atoms, phenyl, benzyl or benzoyl, and t is 1 or 2;
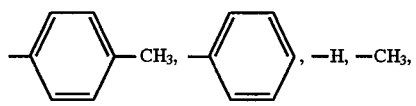   VIII
where —R¹, —R², —R³ and —R⁴, independently of one another, are
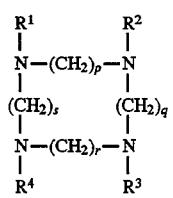 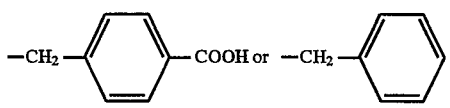
and
p, q, r and s, independently of one another, are an integer from 2 to 4, where p+q+r+s=8 to 16.
Preferred coronands are:
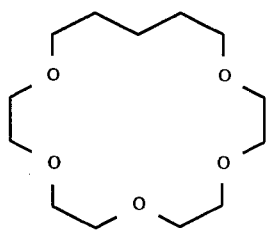
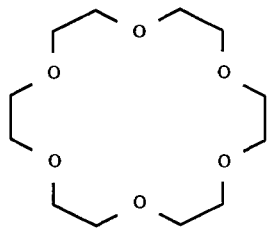
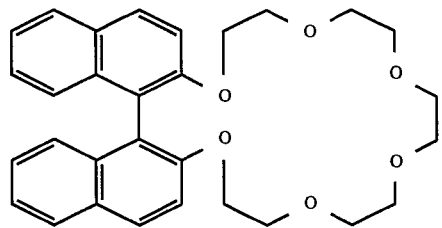
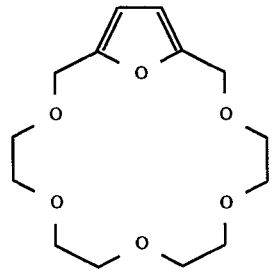

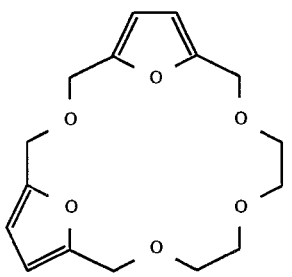
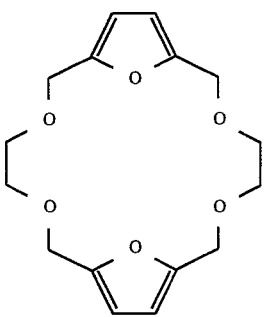
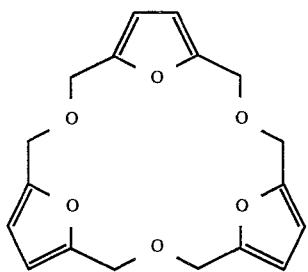
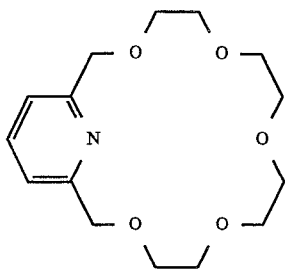
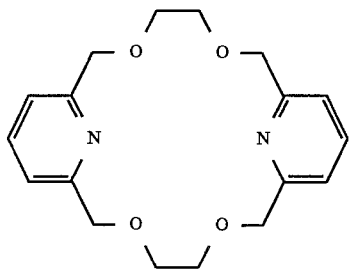

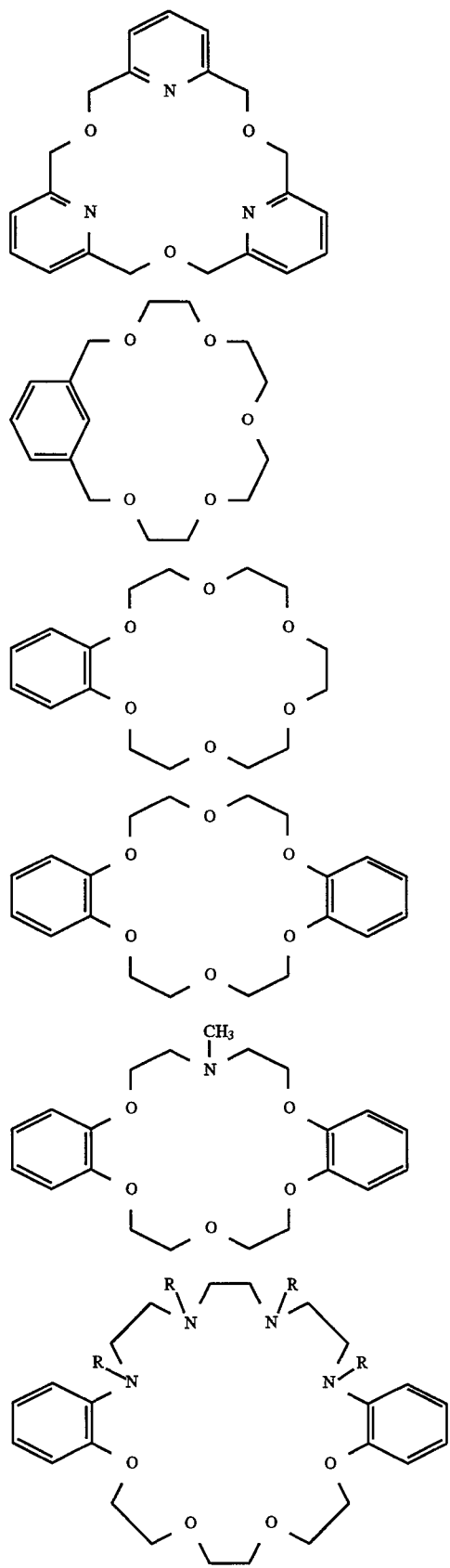
R = alkyl

-continued
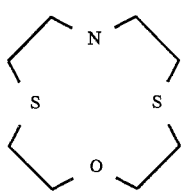
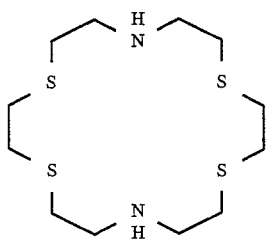
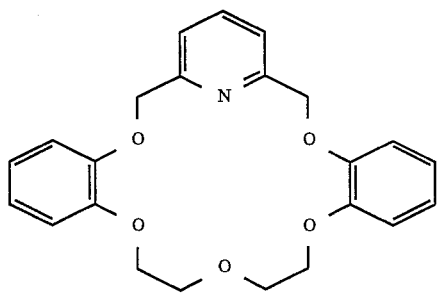
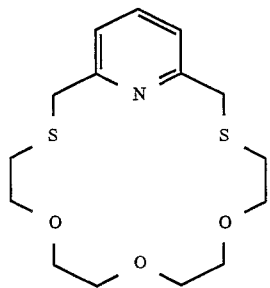
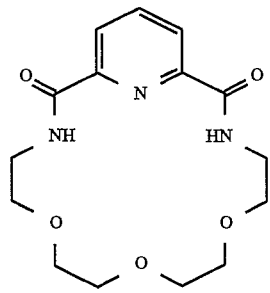

-continued
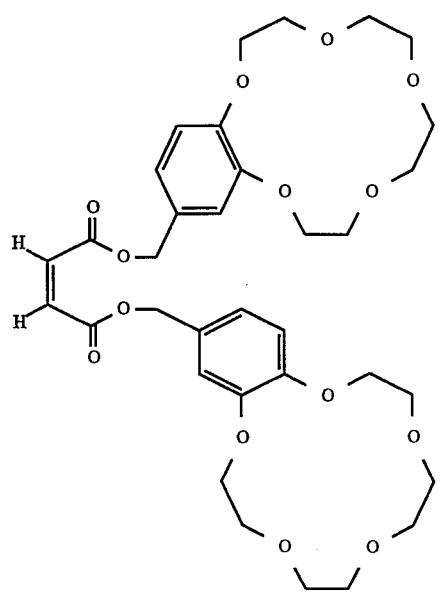
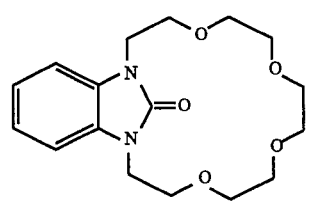
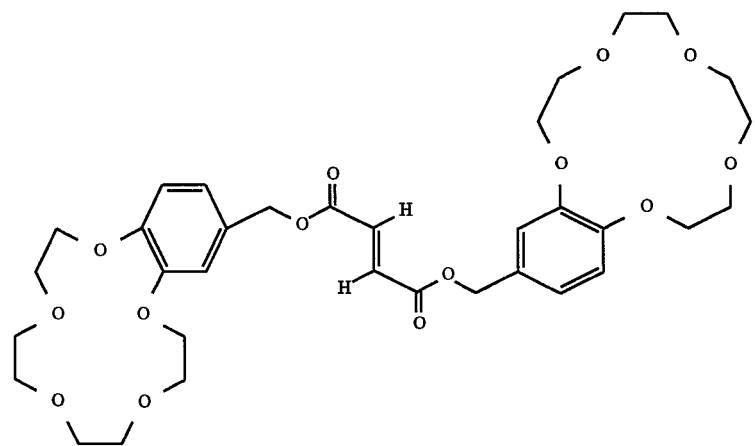
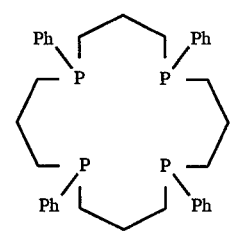

-continued
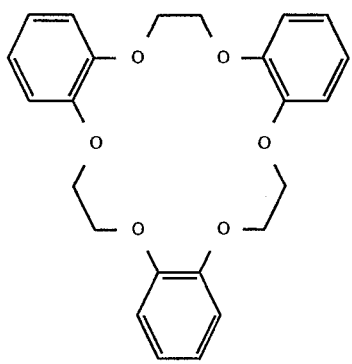
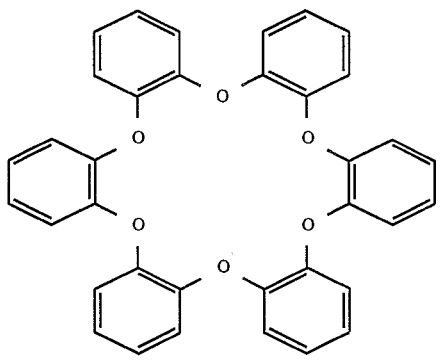
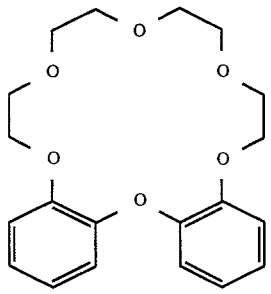
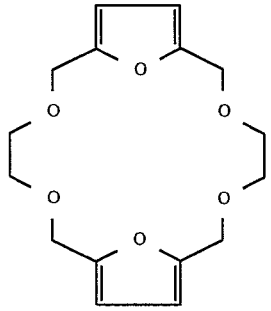
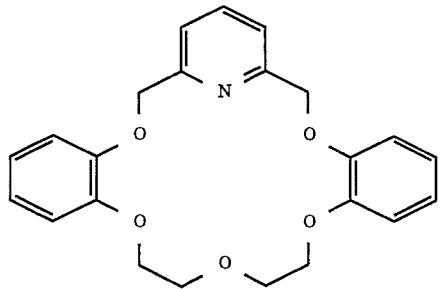

-continued
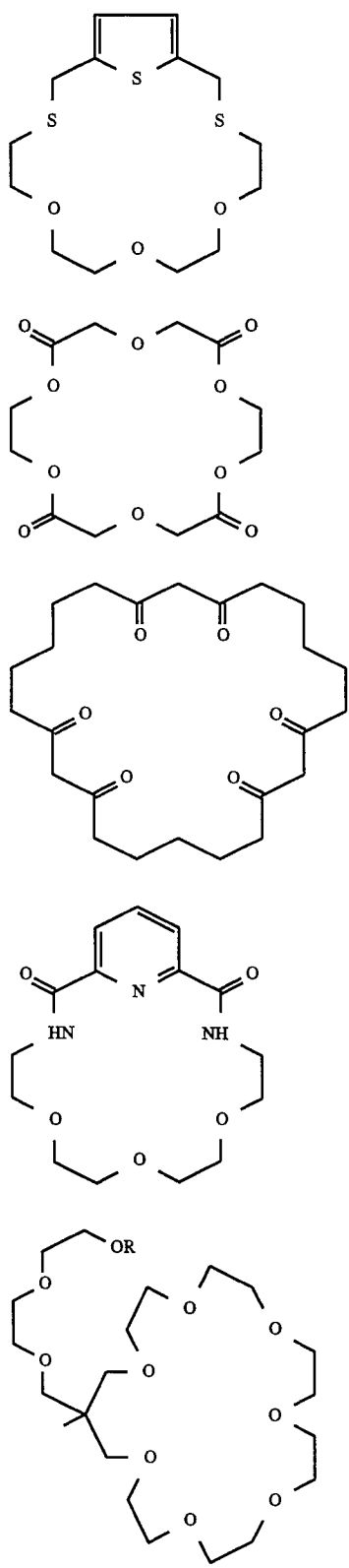

-continued
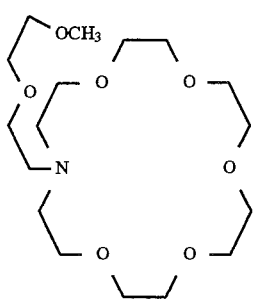
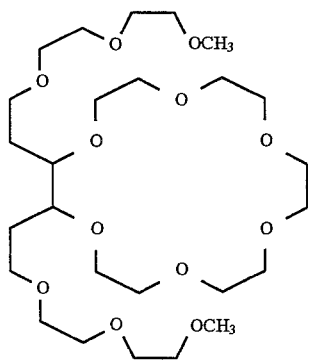
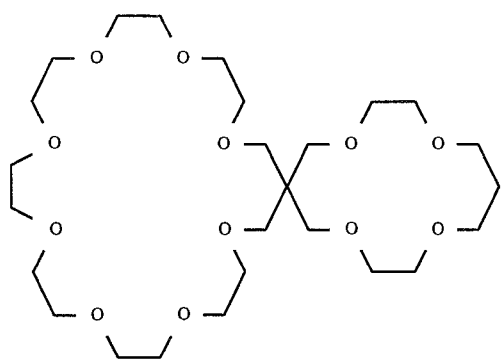
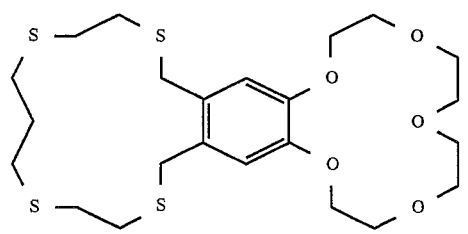
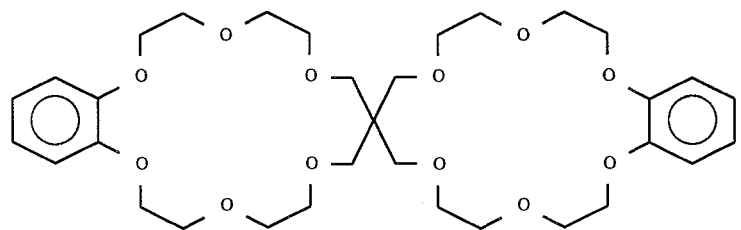

-continued
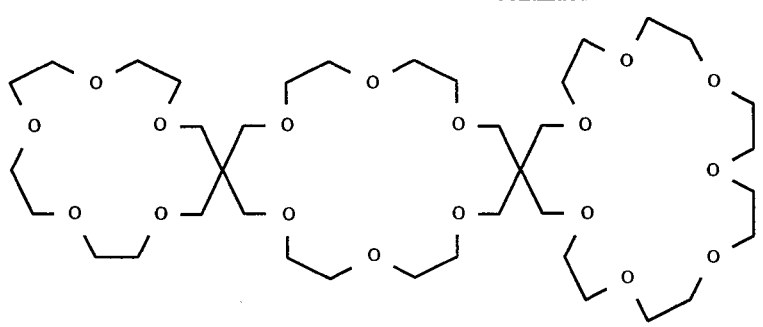
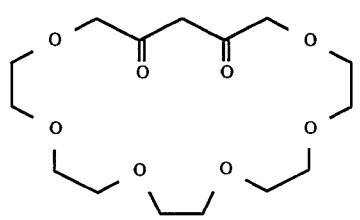
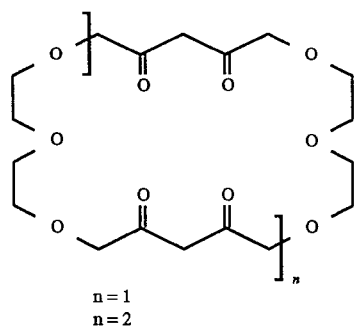
n = 1
n = 2
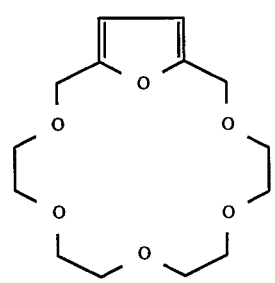
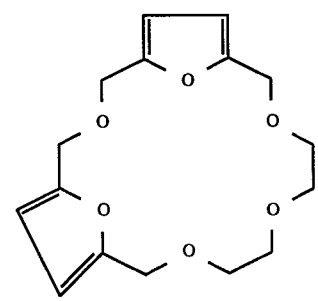

-continued
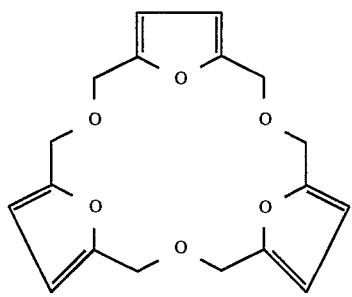
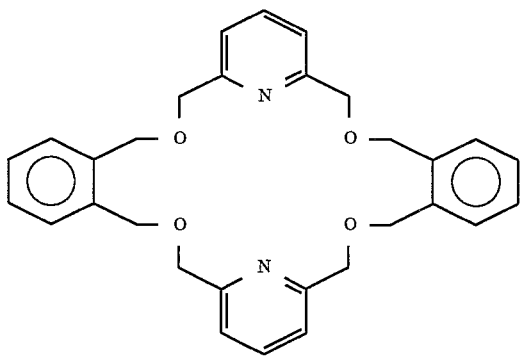
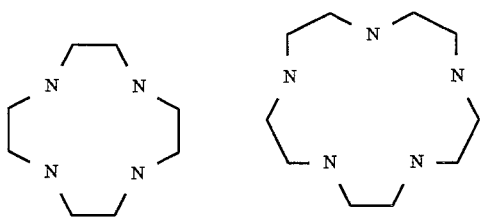
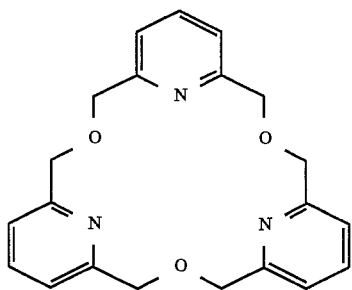
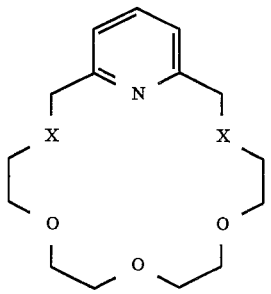
X = O
X = S

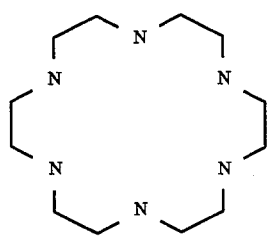
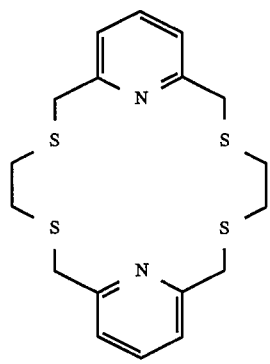
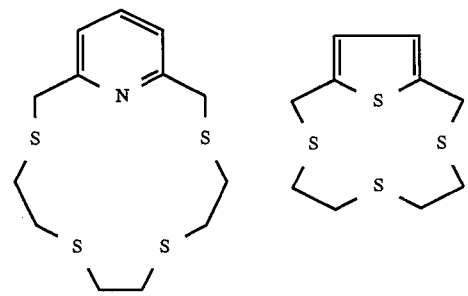
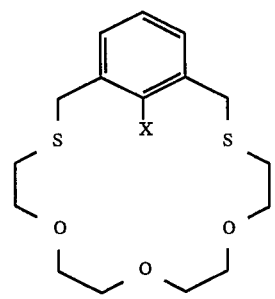
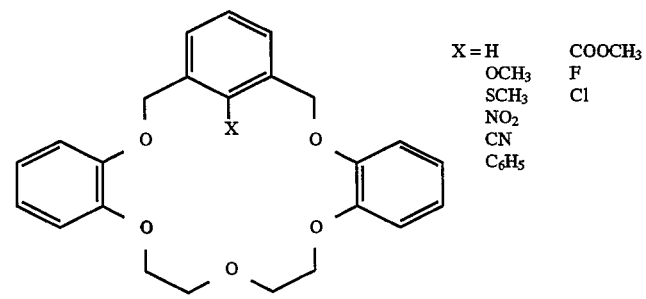
X = H    COOCH₃
OCH₃  F
SCH₃  Cl
NO₂
CN
C₆H₅

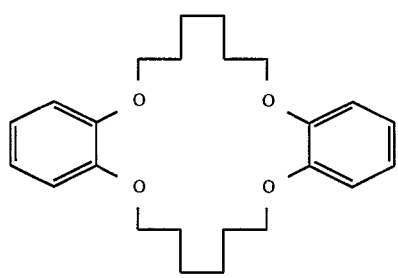
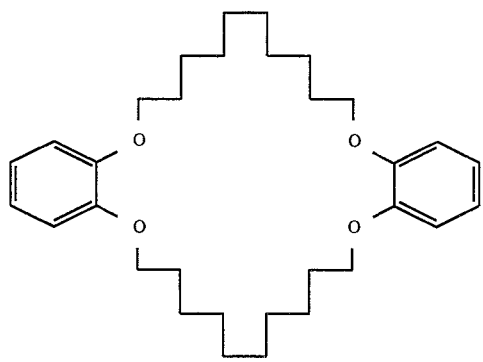
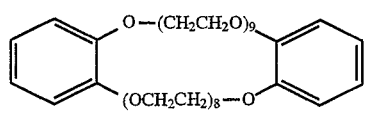
30
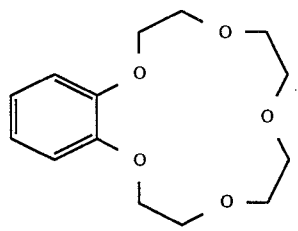
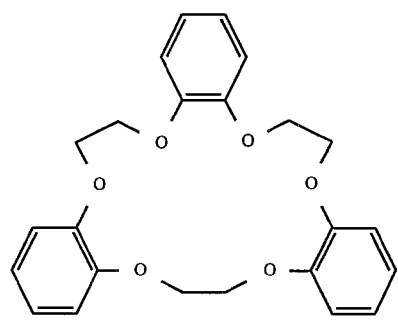
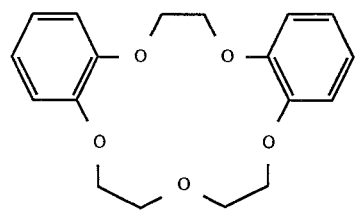

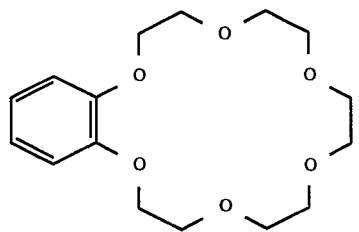
22
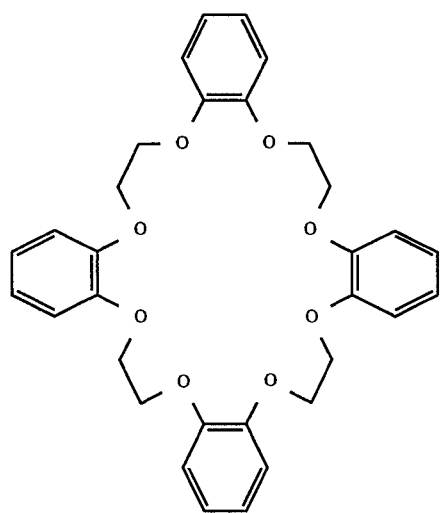
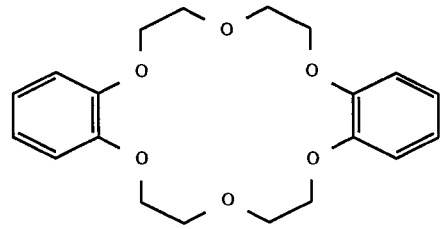
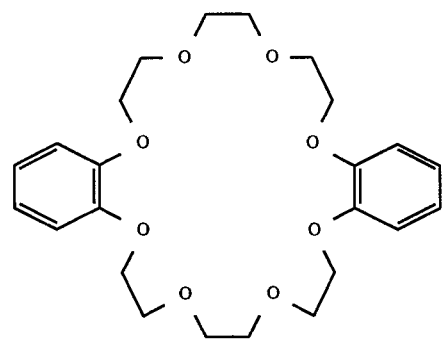
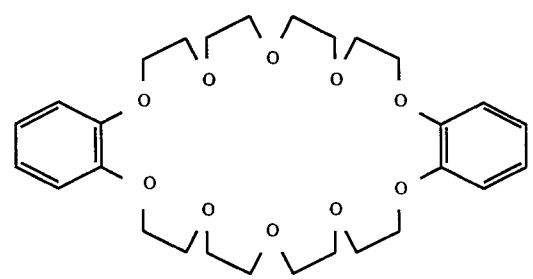

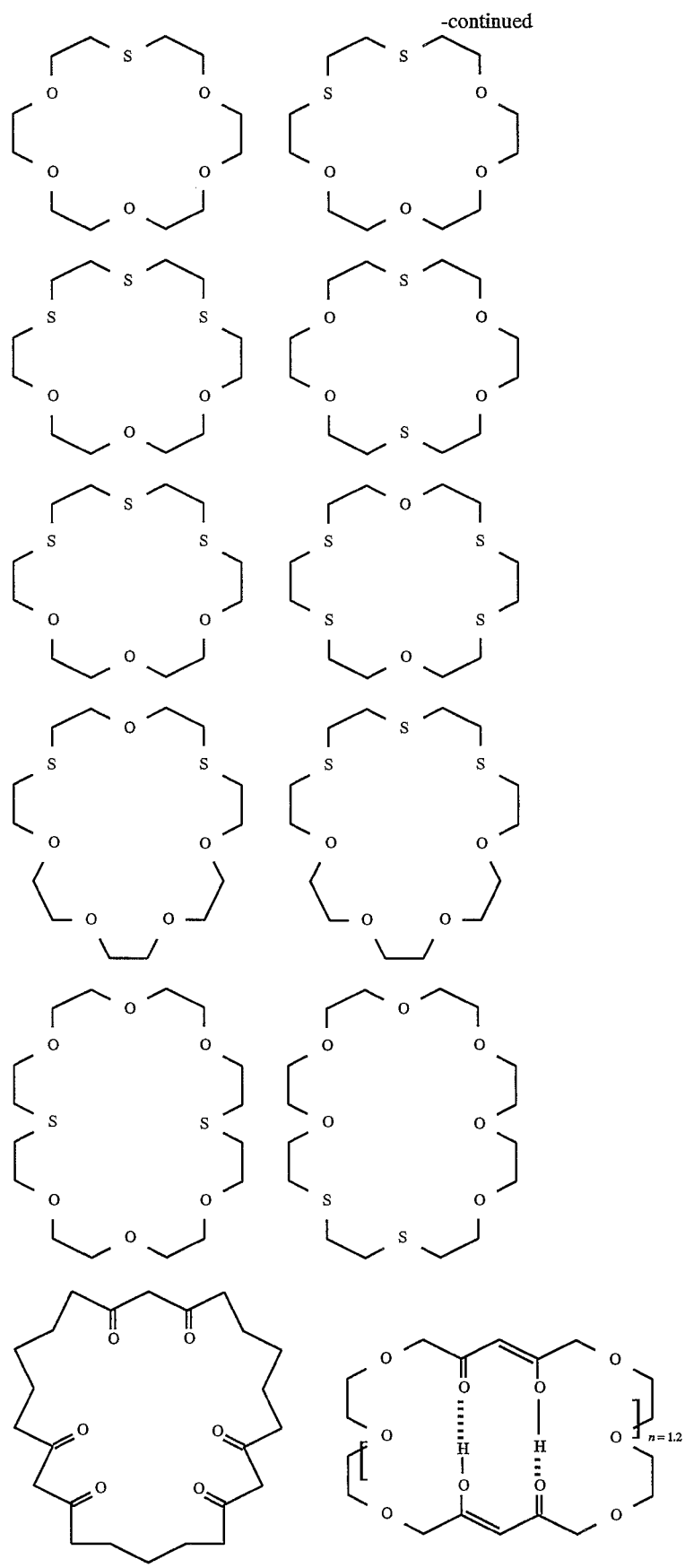

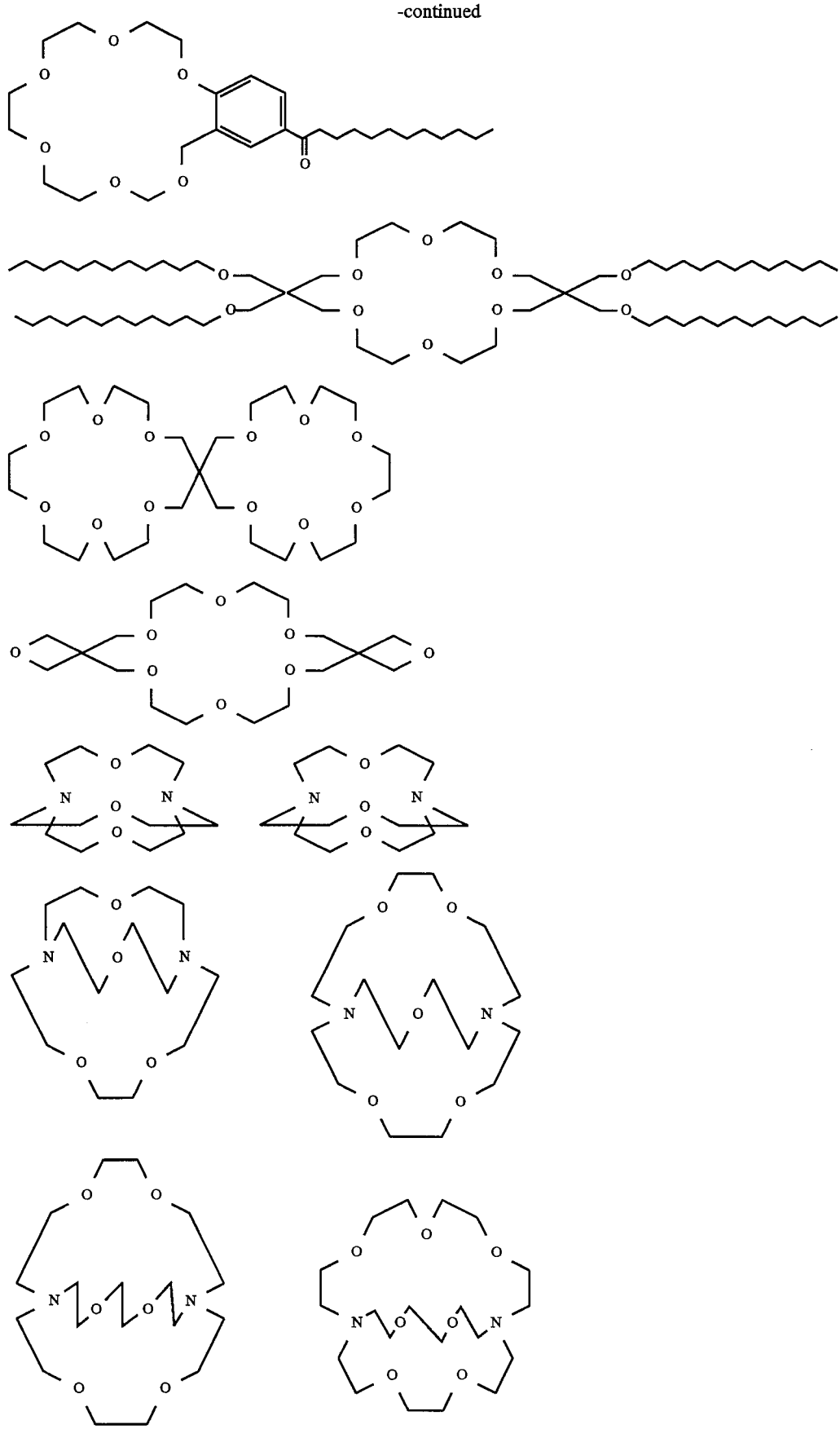

-continued
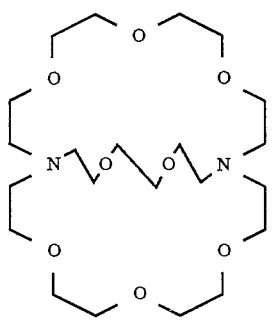
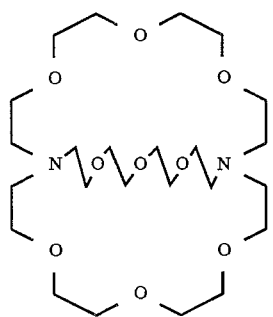
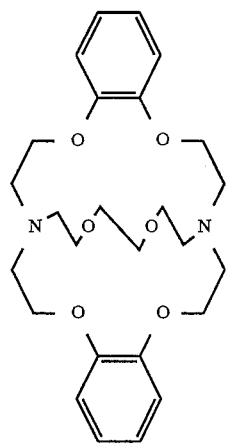
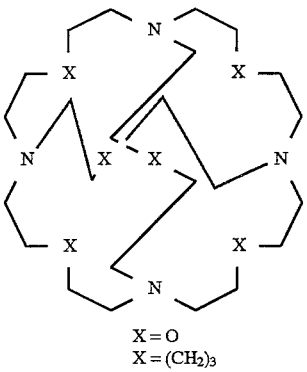
X = O
X = (CH$_2$)$_3$
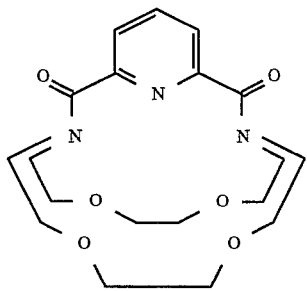
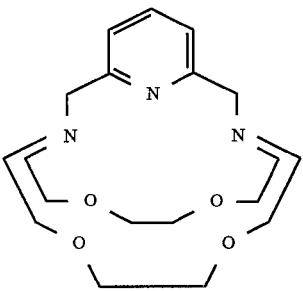
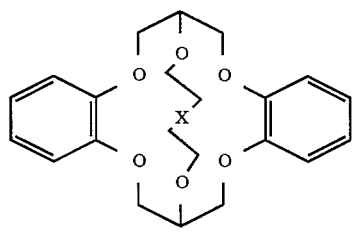
X = OCH$_2$CH$_2$O
X = (OCH$_2$CH$_2$)$_3$O
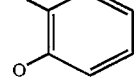

-continued
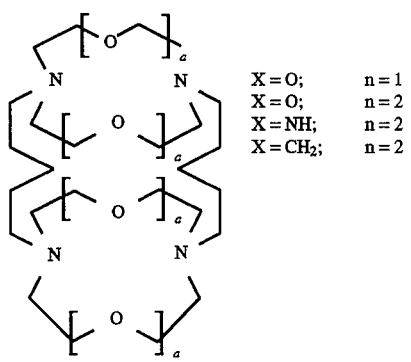
X = O;   n = 1
X = O;   n = 2
X = NH;  n = 2
X = CH₂; n = 2
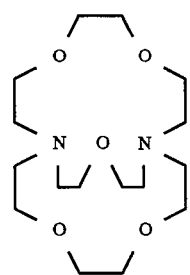
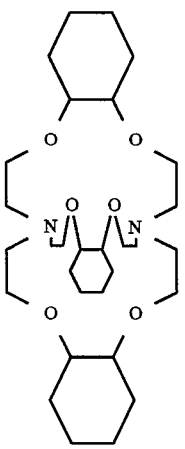
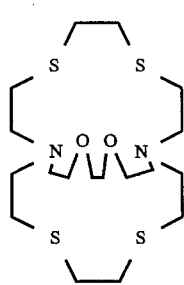
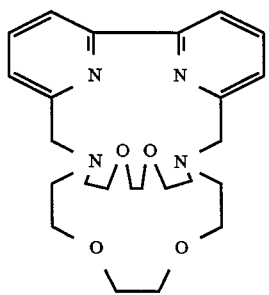
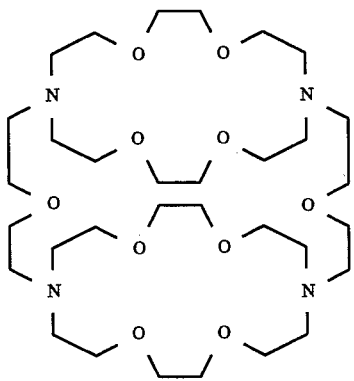

-continued
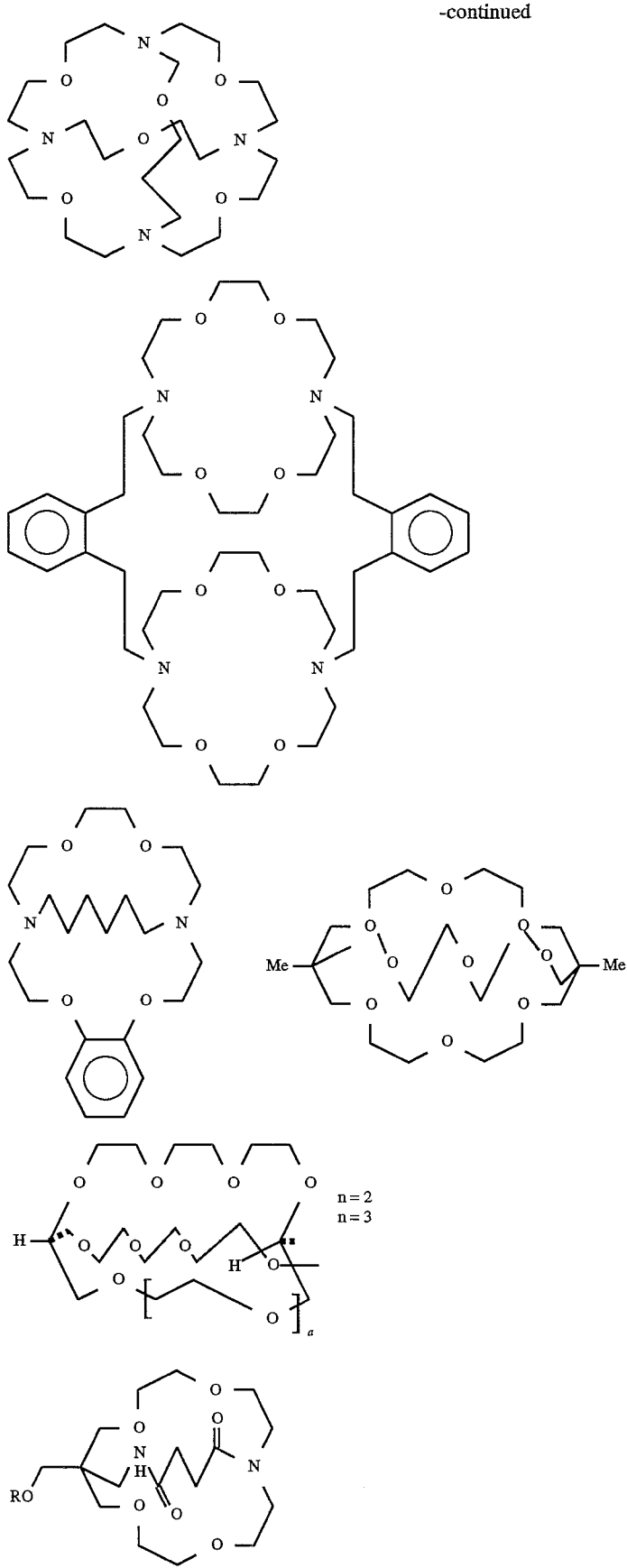

-continued
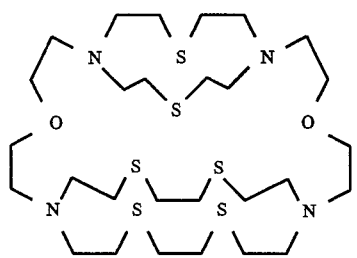
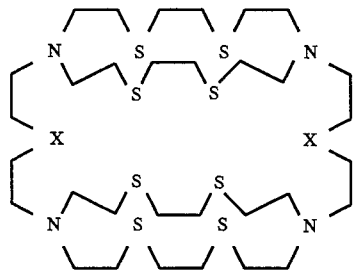
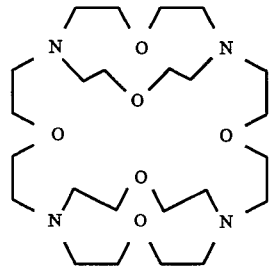
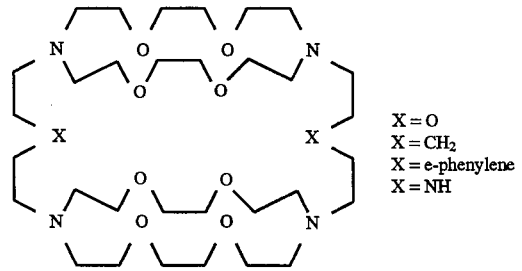
X = O
X = CH$_2$
X = e-phenylene
X = NH -continued
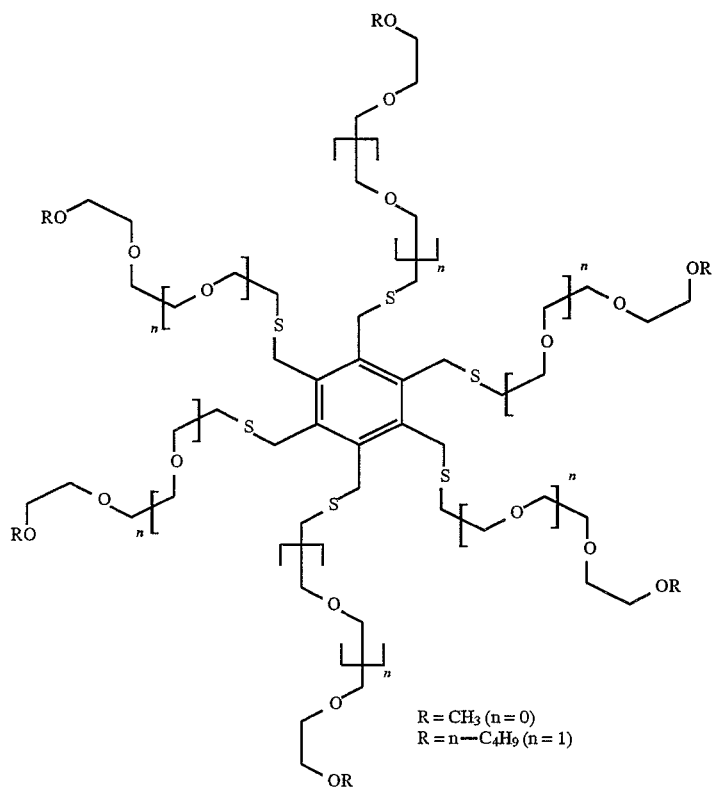
R = CH₃ (n = 0)
R = n—C₄H₉ (n = 1)
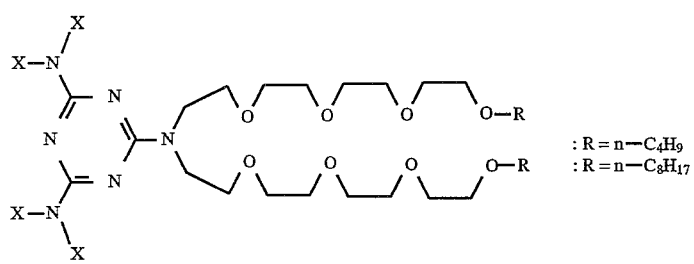
: R = n—C₄H₉
: R = n—C₈H₁₇
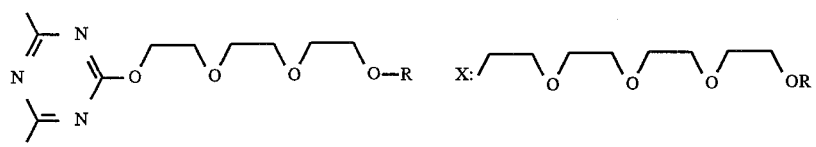
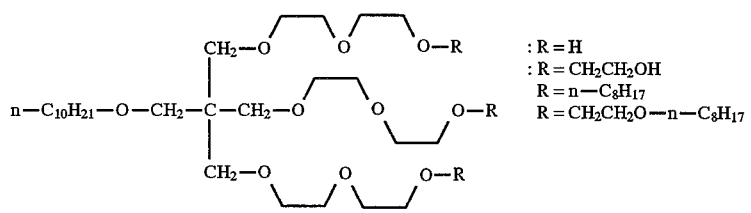
: R = H
: R = CH₂CH₂OH
R = n—C₈H₁₇
R = CH₂CH₂O—n—C₈H₁₇
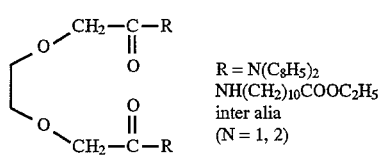
R = N(C₈H₅)₂
NH(CH₂)₁₀COOC₂H₅
inter alia
(N = 1, 2)

-continued
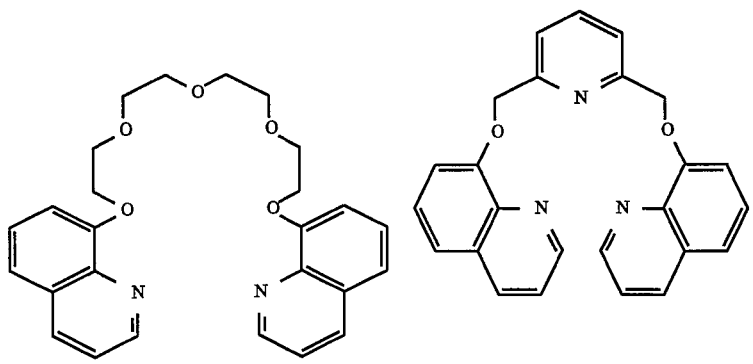
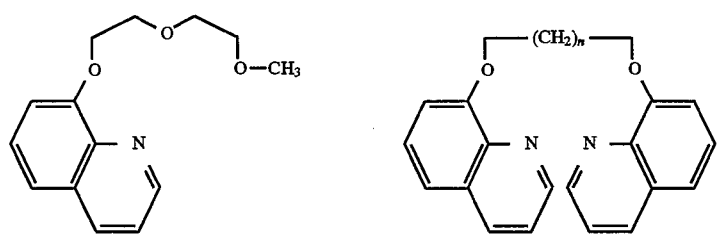
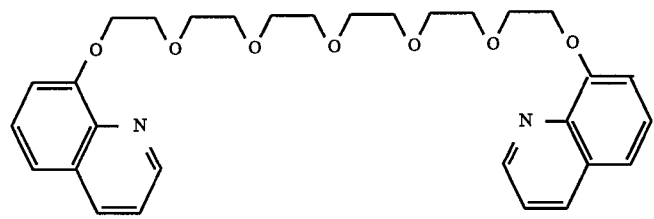
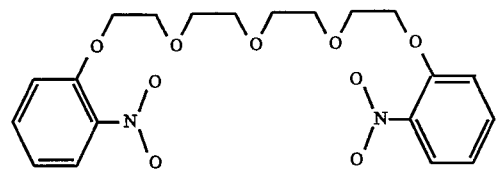
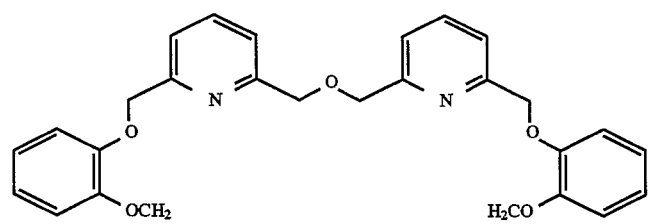
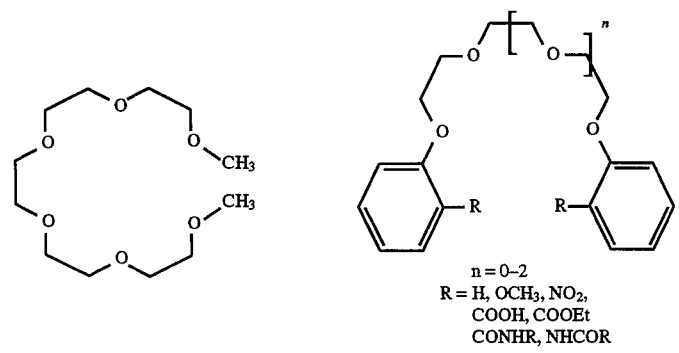
n = 0–2
R = H, OCH₃, NO₂,
COOH, COOEt
CONHR, NHCOR -continued
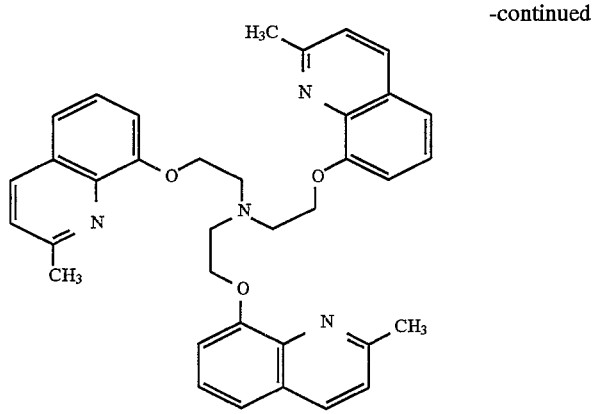
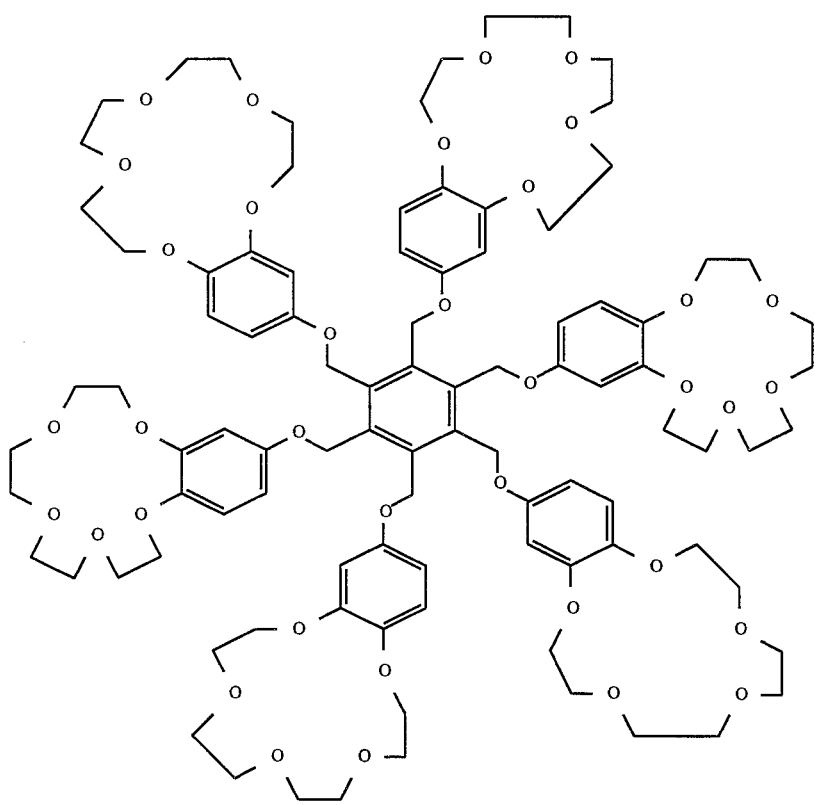
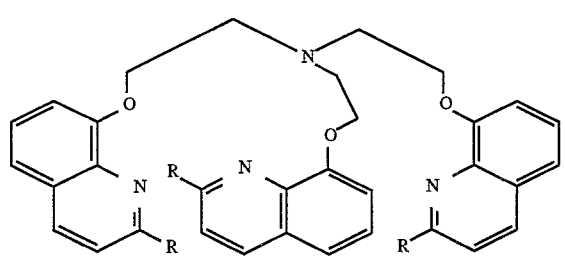
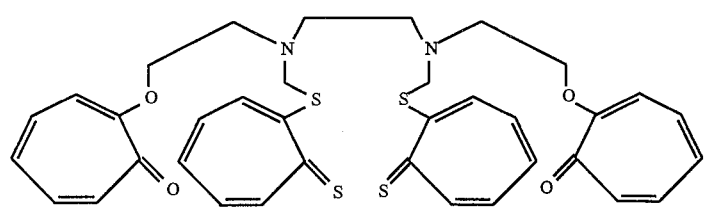

Mercapto compounds to be employed according to the invention are represented by the formula IX below:

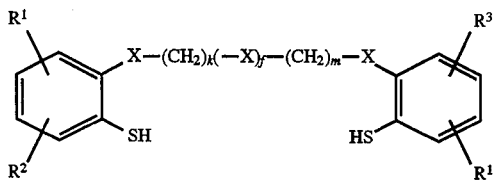

where

R¹, R², R³ and R⁴, independently of one another, are a hydrogen atom, alkyl having 1 to 8 carbon atoms or alkoxy having 1 to 8 carbon atoms, —X— is —O—, —S— or —NH—, k and m, independently of one another, are 1, 2 or 3, and t is zero or 1.

Ionophoric compounds, as presented in EP-A-0 451 821, are also particularly suitable for increasing the contrast in the display by rendering of the alignment layer amphiphilic. The ionophores are defined in greater detail by the formula X:

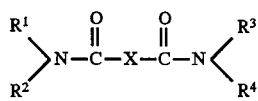

where

R¹, R², R³ and R⁴, independently of one another, are alkyl having 1 to 15 carbon atoms in which one —CH₂— group may be replaced by —COO— or —CO— or a CH₂— group which is not bonded directly to the nitrogen atom may be replaced by —O—, or are cyclohexyl, phenyl or benzyl, and X is alkylene having 2 to 9 carbon atoms in which one or two non-adjacent —CH₂— groups may be replaced by —O—, two adjacent CH₂— groups may be replaced by 1,2-phenylene or 1,2-cyclohexylene, two adjacent —CH₂— groups may be replaced by —CH(CH₃)—CH(CH₃)—, and one hydrogen atom of a CH₂ group may be substituted by R⁵ or R⁶, where R⁵ is alkyl having 1 to 15 carbon atoms and R⁶ is alkyl having 1 to 15 carbon atoms or —CH₂—O—CH₂—CO—NR¹R².

Very generally, said compounds can be coupled to or in the alignment layer in, for example, the following ways:

I Chemical coupling—i.e. the compound providing a amphiphilic effect is preferably bonded to/in the alignment layer via covalent bonds. The compound to be bonded on has the formula

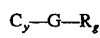

where

C_y is one of the abovementioned compounds providing a amphiphilic effect;

G is a straight-chain or branched alkylene unit having 0 to 18 carbon atoms in which, in addition, one or more —CH₂— groups may be replaced by —O—, —S—, —C—, —CO—, , —CH=CH—, —C≡C— or
         ‖     ‖
         O     O
—Si (CH₃)₂—, -continued

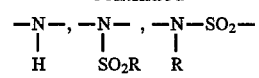

cycloalkanediyl, arenediyl or heteroarenediyl in which, in addition, one or more hydrogen atoms of the CH₂ groups may be replaced by F;

R_g is a reactive group (coupling functionality), for example —OH, —CO₂H, —CO₂R, —NH₂, —NHR', —SH,

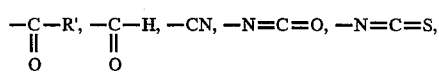

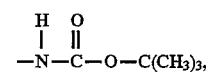

—CH=CH₂, —Si(CH₃)₂Cl, —Si(CH₃)₂OR', —Si(OR)₃, —N₃, halide, —N≡C or SO₂CH=CH₂.

Preference is given to compounds in which C_y is the macrocyclic compounds, cryptands or coronands described at the outset.

Very particular preference is given to compounds in which C_y has the following meaning:

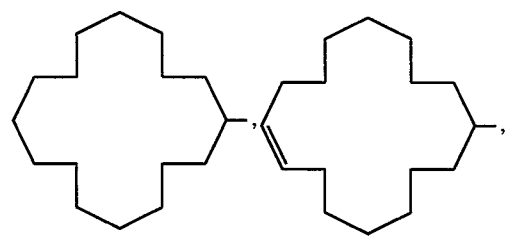

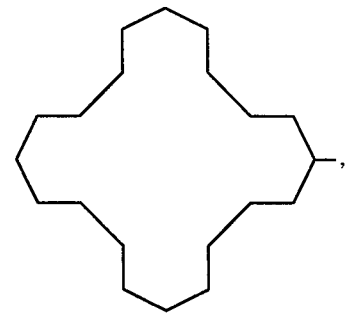

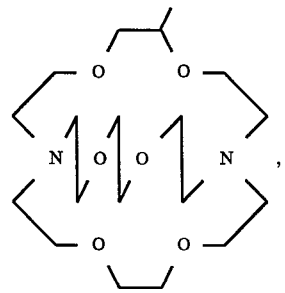

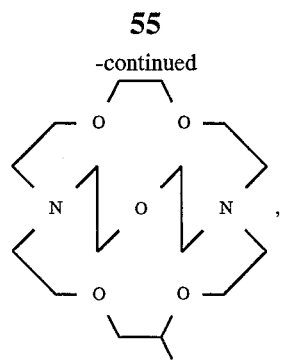
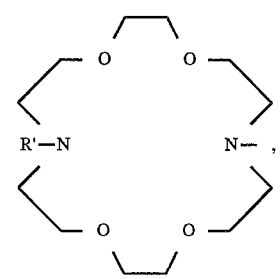
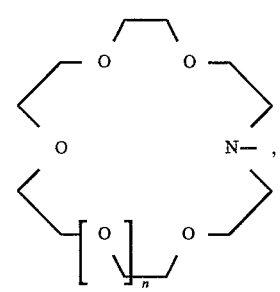
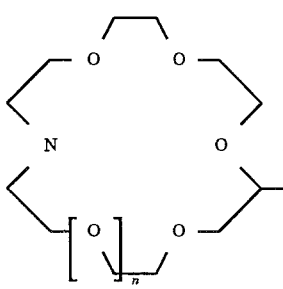
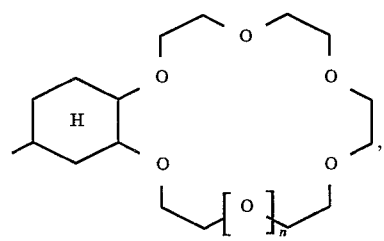
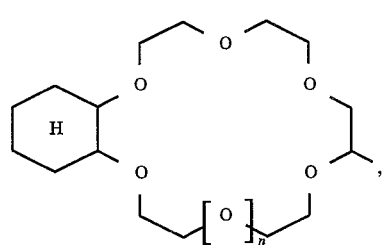
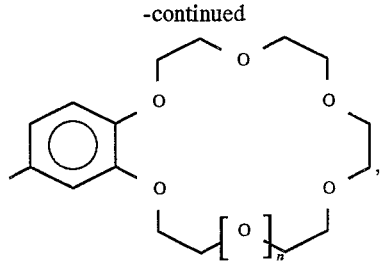
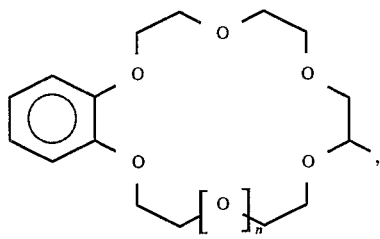
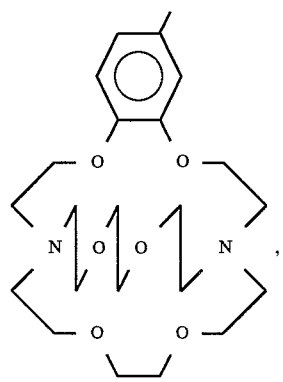
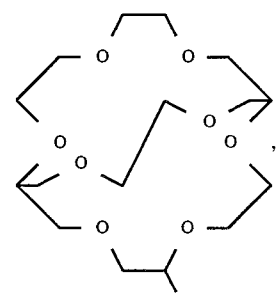
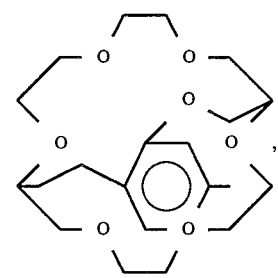
n = 0, 1 or 2.

Most preference is given to compounds in which $C_y$ is

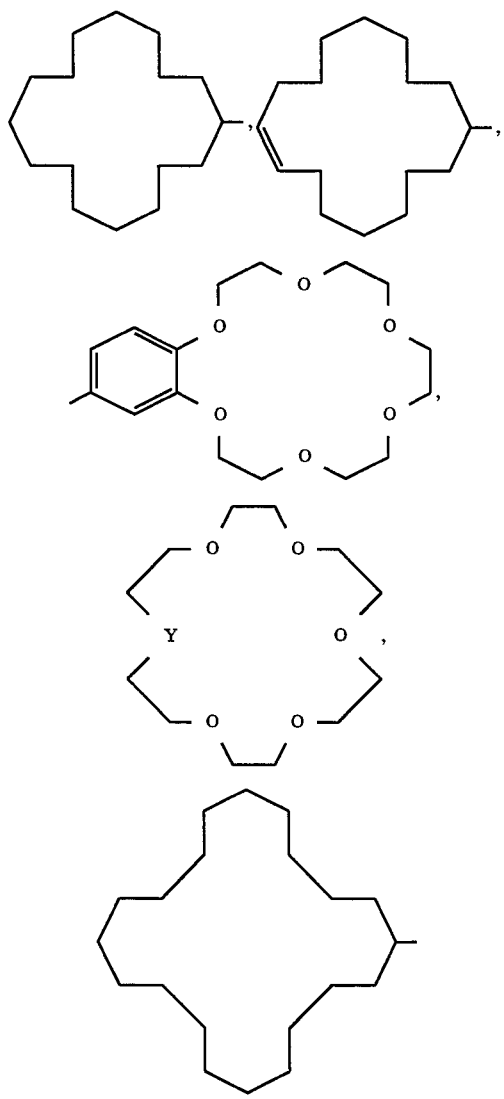

G is —O—$(CH_2)_m$— or —$(CH_2)_m$—,
Y is —O— or N-alkyl or N-aryl,
$R_g$ is —$CO_2R'$, —N=C=O, —$Si(CH_3)_2OR'$, —$NH_2$ or —OH.

II Physisorption

The compounds providing the amphiphilic effect are adducted onto the surface of the alignment-layer molecules by relatively weak or relatively strong intermolecular attractive forces. The strength of the coupling to the surface can be increased by binding polar or polarizable groups into the compounds providing the amphiphilic effect.

The positive effect of the compounds providing a amphiphilic effect on the alignment layer can be further reinforced by the liquid-crystal mixtures which likewise contain these compounds, in particular coronands and cryptands.

In displays, the alignment layer treated according to the invention has the effect, in particular, of suppressing twist states and ghost images and thus of improving the optical contrast.

Furthermore, the alignment layer rendered amphiphilic can be used to produce a shock-resistant liquid-crystal switching and display device. Addition of the compounds to be employed according to the invention, in particular coronands and cryptands, to alignment layers allow the FLC mixtures to be brought into a uniform and twist-free bookshelf or quasi-bookshelf alignment by applying a continuous periodic electric voltage (explanation of terms: Dübal et at., Proc. 6th Intl. Symp. of Electrets, Oxford, England (1988); Y. Sato et al., Jap. J. Appl. Phys. 28 L 483 (1989)).

It has thus been found that the polymers containing the maleimide units described can advantageously be employed as alignment layer in liquid-crystal displays which can be operated at high temperatures, preferably from 30° to 70° C., in particular from 40° to 60° C., as occur, for example, in projection applications.

Shock-damaged liquid-crystal displays can be re-generated using the substances providing an amphiphilic effect in alignment layers by applying a continuous, periodic voltage, as has already also been proposed in EP-A 0 451 820 using the substances in FLC mixtures.

The invention is described in greater detail by the examples.

EXAMPLES

A) Synthesis Examples

Example 1

Preparation of Maleimide-Styrene Copolymer from Maleimide and Styrene 52 g of styrene and 48.5 g of maleimide, which are commercially available, are dissolved in 350 ml of cyclohexanone and warmed to 80° C. under a stream of nitrogen. After 0.5 g of AIBN has been added, the mixture is stirred at 80° for a further 4 hours. The resultant composition is diluted with cyclohexanone and filtered through a pressure filter. The polymer, whose molecular weight is between 10,000 and 40,000 ($M_w$, determined by GPC), is precipitated by addition of methanol.

Yield: 96%

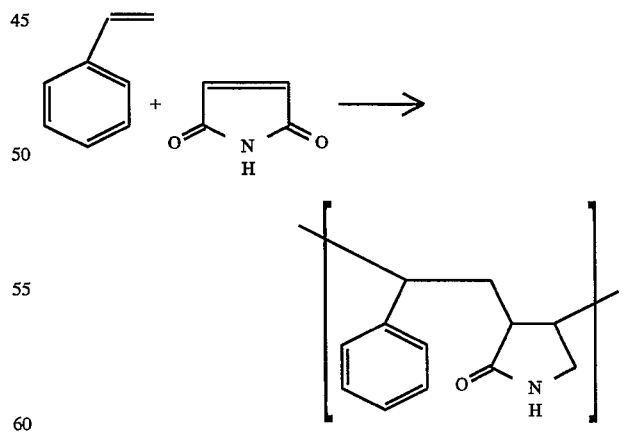

Polymers P2–P6 are prepared analogously.

Example 2

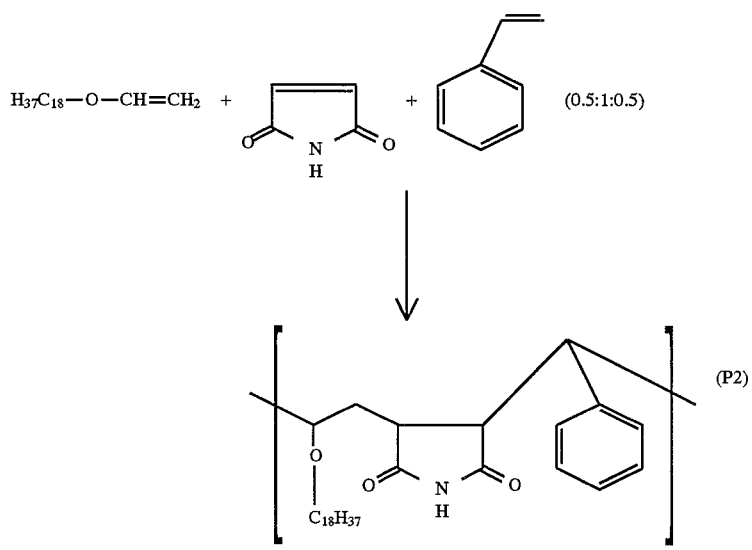
Example 3
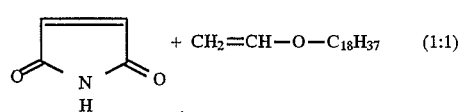
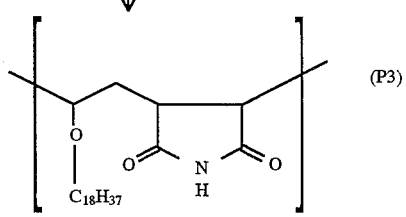
Example 5
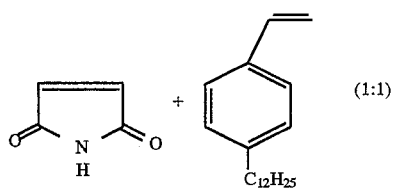
Example 4
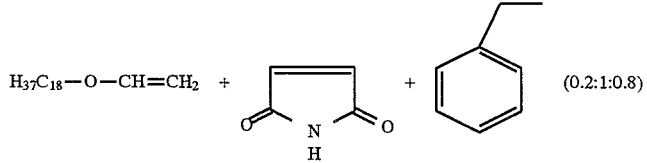
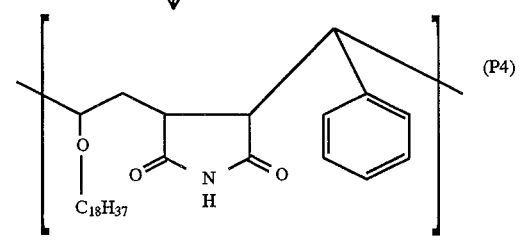

-continued

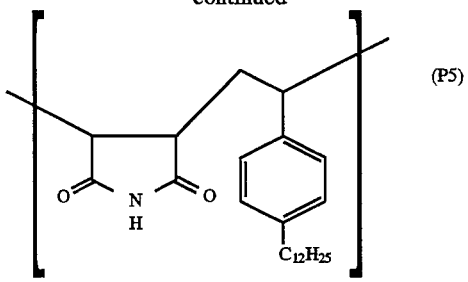

(P5)

Example 6

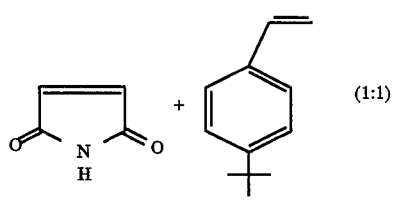

(1:1)

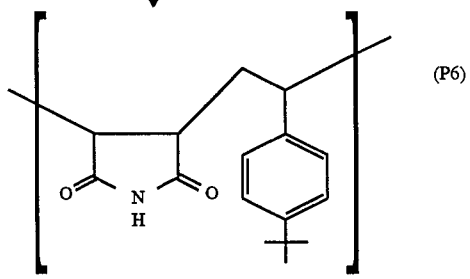

(P6)

Example 7

Preparation of Maleimide-Styrene Copolymer from Maleic Anhydride-Styrene Copolymer 3.0 g of maleic anhydride-styrene copolymer, styrene content 50%, $M_w$ 350,000, are heated at 150° C. for 18 hours in a shaken autoclave together with 40 ml of 25% strength by weight aqueous $NH_3$; a pressure of 16 bar becomes established.

After cooling, the majority of the polymer is in opaque solution. The reaction product is evaporated in a rotary evaporator, first at atmospheric pressure and subsequently in vacuo. The solution has a high tendency to foam. The flask contents which remain are removed, dried at 80° C. in vacuo, comminuted and dried further to constant weight, giving 2.8 g of a pale powder; elemental analysis gives 6.0% N, calculated 6.9% N. The infra-red spectrum (DMSO) shows a broad carbonyl-imide band at 1630–1700 $cm^{-1}$.

Example 8

N-Hexylmaleimide-Styrene Copolymer 5 g of maleic anhydride-styrene copolymer having a styrene content of 50 mol %, $M_w$ 350,000, is refluxed for 18 hours with 2.5 g of hexylamine (=3.3 ml) in 100 ml of toluene, where the toluene runs out over a Soxleth [sic] apparatus filled with $CaCl_2$ as desiccate and mounted on top of the apparatus, and is thus kept dry. The toluene is removed by vacuum distillation in a rotary evaporator, and the flask contents are subsequently freed from any residues of hexylemine in a high vacuum. The residue is dried in vacuo over conc. $H_2SO_4$, giving about 7 g of polymer having an N content of 4.5%, calculated 4.8%. The infra-red spectrum shows a C=O band at 1650–1700 $cm^{-1}$.

Further amines are reacted with a maleic anhydride-styrene copolymer analogously to the processes described in Examples 1 and 2. Since temperatures of above 110° C., better >150° C., are necessary for the reaction, a pressure vessel must be used for low-boiling amines (Example 7). In the case of higher-boiling amines, the process can be carried out under reflux in toluene, with the water liberated during the reaction being removed, for example as described in Example 8.

Table A below shows amines as reactants which are reacted with the above-mentioned copolymer ($M_w$ 350,000, 50 mol % of styrene) in toluene by the methods of Examples 7 or 8. Also shown are the reaction temperature and duration and the nitrogen content determined by elemental analysis, if appropriate also the fluorine content. For work-up, the polymer product precipitated at low temperature is filtered off via a suction filter, the precipitate is washed with methanol and the precipitate is dried in vacuo for 48 hours over conc. $H_2SO_4$ to constant weight. The conversion to the N-alkylimide compound can be monitored in the IR through the disappearance of the anhydride and at 1810/1750 $cm^{-1}$ and the appearance of the imide carbonyl band at 1700 $cm^{-1}$.

TABLE A

| Example No. | Amine | Molor ratio with respect to maleic anhydride | Method | Temp. °C. | Reaction duration h | Yield % |
|---|---|---|---|---|---|---|
| 9 | $CH_3NH_2$ | 1:1 | Ex. 7 | 150° | 18 | >90 |
| 10 | $(CH_3)_3C-NH_2$ | 1:1 | " | " | " | " |
| 11 | n-$C_{12}H_{25}$-$NH_2$ | 1:1 | Ex. 8 | 110 | " | " |
| 12 | n-$C_{18}H_{37}NH_2$ | 1:2 | " | " | " | " |
| 13 | n-$C_{18}H_{37}NH_2$ | 1:1 | " | 180 | " | " |
| 14 | $H_2N-CH(CH_3)-CH_2(OCH(CH_3)-CH_2)_3O-CH_2-CH(CH_3)-NH_2$ | 2:5 | " | 110 | " | " |
| 15 | $HO-CH_2-CH_2-O-CH_2CH_2-NH_2$ | 1:1 | " | " | " | " |

TABLE A-continued

| Example No. | Amine | Molor ratio with respect to maleic anhydride | Method | Temp. °C. | Reaction duration h | Yield % |
|---|---|---|---|---|---|---|
| 16 | 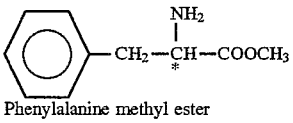 Phenylalanine methyl ester | 1:1 | Ex. 8 | 110 | 18 | >90 |
| 17 | $C_8F_{17}$—$C_2H_{21}$—O—$C_3H_6$—NH2 | 1:1 | " | " | " | " |

Example 18

N-Perfluorooctanoylmaleimide-Styrene Copolymer 2.0 g of maleimide-styrene copolymer are dissolved in 150 ml of refluxing THF. 0.3 g of 80% NaH is added in portions with stirring under a protective gas, and the mixture is stirred at 70° for a further 30 minutes. The sodium imide compound prepared in this way is reacted with 2.25 ml (=4.32 g) of perfluorooctanoyl chloride, vigorous foaming occurring initially. The batch is kept at 70° for 4 hours and cooled to room temperature, after which a precipitate forms which is filtered off with suction and washed with methanol. Drying in a high vacuum gives 3.8 g of a white polymer. According to elemental analysis, this has a fluorine content of 30.8% compared with a calculated fluorine content of 47.7% after complete conversion, i.e. about ⅔ of the imide nitrogen is occupied by perfluorooctanoic acid.

Example 19

N-(Butoxycarbonylethyl)Maleimide-Styrene Copolymer 2 g of maleimide-styrene copolymer are dissolved in 25 ml of DMF, 3 g of triphenylphosphine and 1.8 ml of ethyl azodicarboxylate are added, and the mixture is stirred for 15 minutes, during which slight warming occurs. 1.5 ml of L-(−)-butyl lactate are then added, and the mixture is stirred at room temperature for 20 hours, giving a clear, red-brown solution, which is poured into 300 ml of methanol. A milky-white precipitation of the polymer is obtained. Since the substance has a tacky consistency, it is separated off by centrifugation. After repeated washing with methanol and centrifugation, the product is dried at 70° C. in a drying cabinet. Yield 2.5 g. The polymer exhibits a rotation value of $[\alpha]_D^{20}=+6.7°$ in the DMF solution.

Example 20

Modification of a Maleic Anhydride-Styrene Copolymer Alignment Layer by Means of Dodecylamine 2 sheets of glass prepared for cell construction and coated with indium-tin oxide (ITO) electrodes are coated, as described above, by spin-coating with a maleic anhydride-styrene copolymer which has an $M_w$ of 50,000 and a styrene content of 50 mol %. The solution is 0.5% strength by weight in methoxypropanol. After heating and fixing, a 1% strength by weight solution of dodecylamine in xylene is applied to the copolymer by spin-coating in a further operation. The lysine is fixed to the alignment layer by heating for a further 30 minutes at 130° C. Cooling is followed by washing twice with isopropyl alcohol and then drying. The glass sheets prepared in this way are then bonded in the manner described below to give test cells.

Particular Embodiments

In a particular embodiment, the novel alignment layer P1 (maleimide-styrene copolymer) is modified at the surface by means of an additive Z1. Z1 contains functional groups which enable chemical bonding to the polymer P1.

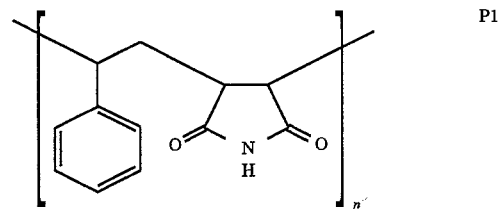

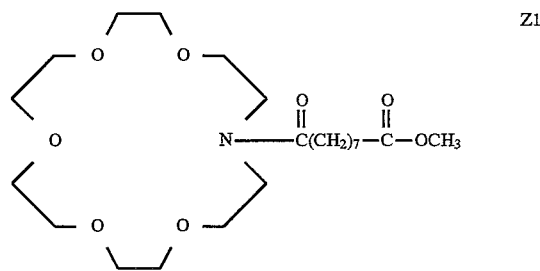

The bonding of the additive Z1 to the alignment layers P2 to P5 is carried out analogously.

In a further preferred embodiment, the novel alignment layer P1 (maleimide-styrene copolymer) is modified at the surface by means of an additive Z2. Z2 contains functional groups which enable chemical bonding to the polymer.

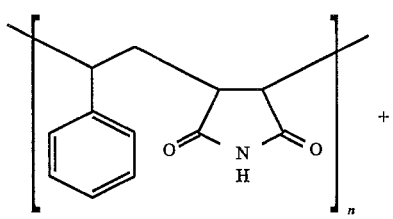

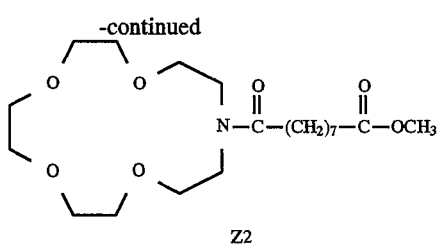

Z2

B) Measurement Examples

Construction of Test Cells

In order to demonstrate the advantageous properties of the alignment layers according to the invention, test cells are produced, filled with ferroelectric liquid-crystal mixtures and then tested.

To this end, glass plates coated with indium-tin oxide (ITO) are cut and treated photolithographically so that small glass substrates having an electrode area of about 8×8 mm² are formed. These glass substrates are then cleaned first in an aqueous surfactant solution and subsequently twice in Millipore water (=demineralized water which has been substantially freed from particles via a Millipore filter unit) at about 60° C. in an ultrasound bath. After the glass substrates have been dried by means of hot air, they are coated with a wet film of a 0.5% strength by weight solution of P1 in cyclohexanone. The coating is carried out by means of a spin coater, but it can also be carried out by means of other methods, for example printing or immersion. The solution is dripped onto the glass substrate until it covers the latter completely and is pre-spun for 5 seconds at 500 rpm, after which the main spinning is carried out for 30 seconds at 4000 rpm. The wet film is dried at 160° C. for 30 minutes. The remaining layer thickness of P1 is approximately 15 nm. This alignment layer is then rubbed with a velvet-like material on a rubbing machine (bench speed: 100 mm/min; roller speed 500 rpm; power consumption: 0.4/A). The 1.8 μm spacers are then applied by means of the spin coater (0.05% strength by weight solution in isopropanol; 20 sec, 2000 rpm). The adhesive frame is printed by means of a plotter, and the liquid-crystal test cells are then bonded with the rubbing directions parallel using a membrane press (adhesive conditions: Epoxy 304 (5 parts)+curing agent 310 B (1 part) (both from E.H.C. Japan). Ethyl acetate is then added to the mixture in a ratio of 1:4. Curing temperatures: 20 min/60° C., 20 min/90° C., 40 min/150° C.).

The resultant test cells are investigated with respect to their electro-optical characteristics by means of various liquid-crystal mixtures.

In a further embodiment, an addition layer Z1 is applied in addition to the alignment layer P1 according to the invention. To this end, a 0.5% strength by weight solution of Z1 in 1,4-dioxane is spin-coated onto the alignment layer at 500 rpm for 5 seconds and at 3000 rpm for 30 seconds. This wet film is then dried at 120° C. for 30 minutes, giving chemical fixing of the additive. The excess additive is then, after the drying, washed off with 2-propanol in an ultrasound bath (1 min). After this step, the test cell is again constructed in the manner described above (rubbing etc).

The alignment layers P2 to P6 and the addition layer Z2 are processed analogously.

In order to characterize the alignment layers according to the invention, ferroelectric liquid-crystal mixtures are used. The following are assessed: the alignment of liquid crystal in the test cell containing the alignment layer according to the invention; the switching behavior of the liquid crystal on application of short addressing pulses; the switching behavior of the liquid crystal on application of addressing pulse sequences which simulate operation of a matrix display; and the optical contrast, which is the ratio between the transmissions in the bright and dark switching states.

The alignment layers according to the invention are used both in the chevron structure described at the outset and in the bookshelf or quasi-bookshelf structure. The bookshelf structure is induced from the chevron structure by application of a rectangular voltage of about 10 Hz at an amplitude of from about 10 to 15 V/μm. The cells are positioned in the ray path of a polarizing microscope to which, in addition, a photodiode is attached. The photodiode is connected to a storage oscilloscope and enables recording of the optical transmission of the liquid-crystal cell.

A freely programmable function generator with subsequent voltage amplifier provides the switching pulses necessary for switching to the test cell. A variety of pulse shapes can be input into the function generator via a computer interface.

The pulse shape used simulates matrix-display operation of the 1-pixel test cells employed. The line voltage/column voltage ratio (data pulses) is an important parameter which is defined as the bias ratio. This ratio should be as large as possible, since correspondingly high contrast is only possible for a low data-pulse amplitude.

The contrast is determined via the signals from the photodiode as the ratio between the bright and dark transmissions. A distinction can further be made between the contrast of the memory states (without data pulses) and the contrast in the matrix display (with data pulses), the latter always having lower values.

A further important parameter used to characterize the alignment layers is the effective tilt angle. Twice the tilt angle is identical to the switching angle. The effective tilt angle in the chevron structure is smaller than the molecular tilt angle (inclination of the molecules to the layer perpendiculars) as a consequence of the angled layer structure.

In addition, the occurrence of twist or bend states results in a further reduction in the effective tilt angle. The bluish color observed here for the dark switching state and the low transmission in the bright state result in low contrast.

The effective tilt angle in the bookshelf structure is significantly larger, and the bright state is thus distinguished by greater brightness. However, the occurrence of twist states again results in considerable losses in contrast. The alignment layers employed should therefore substantially suppress the formation of twist states. These properties are characterized using the tilt angle in the chevron structure.

The FLC mixture M1 employed has the following composition (in mol %):

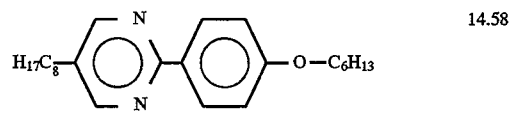

14.58

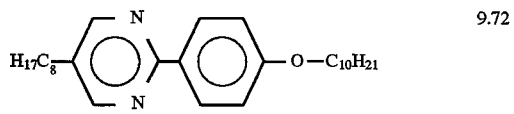

9.72

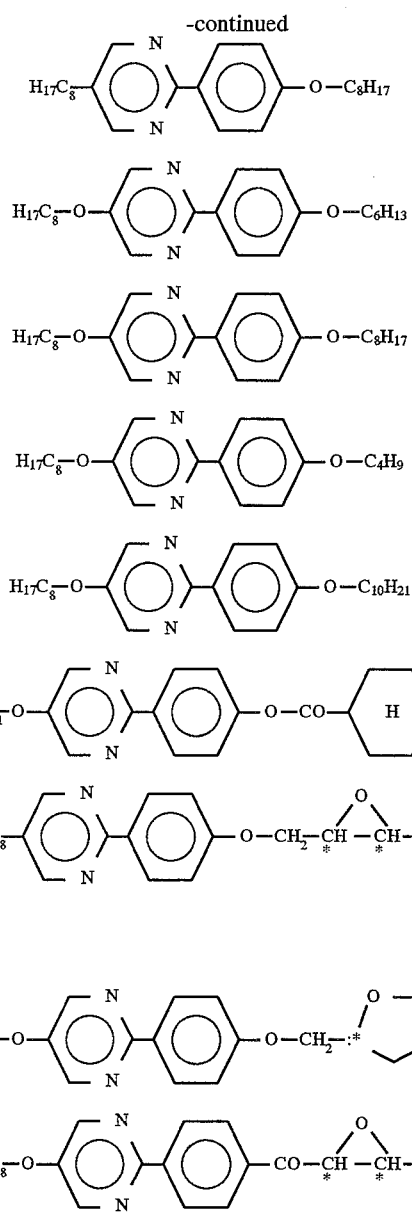

| | |
|---|---|
| H₁₇C₈-[N=pyrimidine]-[benzene]-O-C₈H₁₇ | 13.08 |
| H₁₇C₈-O-[N=pyrimidine]-[benzene]-O-C₆H₁₃ | 9.11 |
| H₁₇C₈-O-[N=pyrimidine]-[benzene]-O-C₈H₁₇ | 4.21 |
| H₁₇C₈-O-[N=pyrimidine]-[benzene]-O-C₄H₉ | 9.62 |
| H₁₇C₈-O-[N=pyrimidine]-[benzene]-O-C₁₀H₂₁ | 7.65 |
| H₂₅C₁₁-O-[N=pyrimidine]-[benzene]-O-CO-[H-cyclohexane]-C₅H₁₁ | 14.42 |
| H₁₇C₈-[N=pyrimidine]-[benzene]-O-CH₂-CH*(O)-CH*-C₄H₉ | 10.50 |
| H₁₇C₈-O-[N=pyrimidine]-[benzene]-O-CH₂-*[epoxide-cyclohexyl] | 1.99 |
| H₁₇C₈-O-[N=pyrimidine]-[benzene]-CO-CH*(O)-CH*-C₃H₇ | 5.12 | and the phase sequence $S_C^*$ 65 $S_A^*$ 73 N* 86 I, with a spontaneous polarization of 38 nC·cm⁻² at a temperature of 25° C.

The FLC mixture M2 employed has the following composition (in mol %)

99.5 mol % of FLC mixture M1
0.5 mol % of

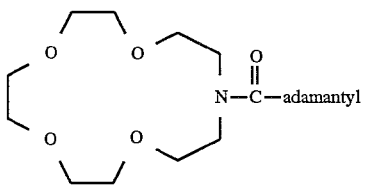

and the phase sequence $S_C^*$ 62 $S_A^*$ 70 N* 83 I, with a spontaneous polarization of 34 nC·cm⁻² at a temperature of 25° C.

The FLC mixture M3 employed had the following composition (in mol %)

99.5 mol % of FLC mixture M1
0.5 mol % of

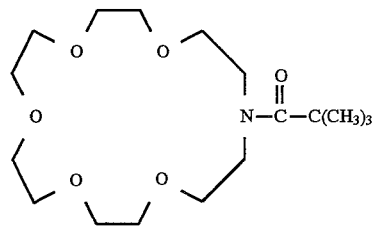

and the phase sequence $S_C^*$ 63 $S_A^*$ 69 N* 86 I, with a spontaneous polarization of 33 nC·cm⁻² at 25° C.

The effective tilt angle and the alignment of the liquid crystal are assessed in the chevron structure, which is formed immediately after the cells are filled. By contrast, the multiplexing and switching properties are measured in the bookshelf or quasi-bookshelf structure, which is obtained from the chevron structure by applying rectangular voltages (10–15 V/μm at 10 Hz, 30 s).

The examples below are measured at room temperature.

| Example 21 | Test cells containing the novel alignment layer P1 are filled with ferroelectric liquid-crystal mixtures M1 and M2. The results are show in Table 1. |
|---|---|
| Example 22 | In a particular embodiment, P1 is reacted with additive Z1 as described above. The cells containing the resultant alignment layer are likewise filled with mixtures M1 and M2. The results are shown in Table 2. |
| Example 23 | In a further embodiment, P1 is reacted with additive Z2 as described above. The cells containing the resultant alignment layer are likewise filled with mixtures M1 and M2. The results are shown in Table 2. |
| Example 24 | In a further embodiment, P3 is reacted with additive Z1 as described above. The cells containing the resultant alignment layer are likewise filled with mixtures M1 and M2. The results are shown in Table 2. |
| Example 25 | Test cells containing the novel alignment layer P2 are filled with ferroelectric liquid-crystal mixtures M1 and M2. The results are shown in Table 3. |
| Example 26 | In a further embodiment, P2 is reacted with additive Z1 as described above. The cells containing the resultant alignment layer are likewise filled with mixtures M1 and M2. The results are shown in Table 3. |
| Example 27 | Test cells containing the novel alignment layer P4 are filled with ferroelectric liquid-crystal mixtures M1 and M2. The results are shown in Table 4. |
| Example 28 | In a further embodiment, P4 is reacted with additive Z1 as described above. The cells containing the resultant alignment layer are likewise filled with mixtures M1 and M2. The results are shown in Table 4. |
| Example 29 | Test cells containing the novel |

-continued

| | |
|---|---|
| | alignment layer P5 are filled with ferroelectric liquid-crystal mixtures M1 and M2. The results are shown in Table 5. |
| Example 30 | In a further use form, P5 is reacted with additive Z1 as described above. The cells containing the resultant alignment layer are likewise filled with mixtures M1 and M2. The results are likewise shown in Table 5. |
| Example 31 | Test cells containing the novel alignment layer P6 are filled with ferroelectric liquid-crystal mixtures M1 and M2. The results are shown in Table 6. |
| Example 32 | In a further use form, P6 is reacted with additive Z1 as described above. The cells containing the resultant alignment layer are likewise filled with mixtures M1 and M2. The results are shown in Table 6. |
| Reference Example 33 | As reference example, liquid-crystal cells from E.H.C. Japan (Tokyo), which contain a polyamide (PIX 1400 Hitachi) as alignment layer, are used. The cells are likewise filled with mixtures M1 and M2. |
| Example 34 | The cells already used in Example 22 (P1 with additive Z1 as alignment layer) are filled with mixture M3. The structure conversion takes place at a temperature of 50° C. with a rectangular voltage of 15 V/μm and 10 Hz for 30 sec. The cell is then left in a memory state for 8 days and after this time the optical contrast in the memory state ($CR_{mem}$), with multiplex addressing ($CR_{dyn}$), the transmission of the bright state in %, relative to parallel polarizers (= 100%), and the CPA (= product of switching pulse height and switching pulse length for switching from 0% to 90%) necessary for switching measured at 30° C., 40° C. and 50° C. |
| Reference Example 35 | The test cells used utilize a polyvinyl alcohol as alignment layer to which additive Z1 has been bonded. The test cells were likewise filled with M3 and investigated in the same way as in Example 24. The results of Example 34 and Reference Example 35 are shown in Table 7. |

Tables 1 to 6 clearly show the advantages of the novel alignment layers P1 to P6 and, in a particular embodiment, with bonded additive Z1 or Z2.

The novel layers suppress twist states, enable good alignment of the liquid crystal and result in higher effective tilt angles than comparable polyimide layers. The switching behavior under matrix display conditions is also significantly better (see maximum bias) compared with the reference example.

Compared to the reference layer, the novel alignment layer used significantly higher contrast values as a consequence of lower residual transmission in the dark switching state. This lower residual transmission is attributable to improved stability of the structure, which becomes particularly significant at high temperatures. The novel alignment layer is therefore particularly suitable for projection applications (projection displays), since temperatures of up to 60° C. can occur in this operation.

TABLE 1

| | Characterization of the novel alignment layer | | |
|---|---|---|---|
| | Alignment layer P1 | Alignment layer P1 + Z1 | Reference example |
| M1 | | | |
| Effective tilt angle θeff (chevron structure) | 8.5°–9° | 10.5° | 7° |
| Alignment of the liquid crystal | very good | very good | very good |
| B*max (maximum bias at a pulse width of 50 μs) | –4 | –5 | — (no window present, so not multiplexable) |
| Twist states | none | none | form |
| M2 | | | |
| Effective tilt angle θeff (chevron structure) | 11° | 11° | 11° |
| Alignment of the liquid crystal | very good | very good | very good |
| B*max (maximum bias at a pulse width of 50 μs) | –6 | –7 | –4 |
| Twist states | none | none | form |

*Maximum possible ratio between switching pulse height and data pulse height for matrix addressing using the quasi-bookshelf structure.

TABLE 2

Characterization of the novel alignment layer

| | Alignment layer P1 + Z2 | Alignment layer P3 + Z1 | Reference example |
|---|---|---|---|
| M1 | | | |
| Effective tilt angle $\theta$eff (chevron structure) | 10° | 10.5° | 7° |
| Alignment of the liquid crystal | very good | very good | very good |
| B*max (maximum bias at a pulse width of 50 μs) | ~5 | ~5 | — (no window present, so not multiplexable) |
| Twist states | none | none | form |
| M2 | | | |
| Effective tilt angle $\theta$eff (Chevron structure) | 11° | 11° | 8.5–9° |
| Alignment of the liquid crystal | very good | very good | very good |
| B*max (maximum bias at a pulse width of 50 μs) | ~7 | ~7 | ~4 |
| Twist states | none | none | form |

*Maximum possible ratio between switching pulse height and data pulse height for matrix addressing using the quasi-bookshelf structure.

TABLE 3

Characterization of the novel alignment layer

| | Alignment layer P2 | Alignment layer P2 + Z1 | Reference example |
|---|---|---|---|
| M1 | | | |
| Effective tilt angle $\theta$eff (chevron structure) | 9° | 10° | 7° |
| Alignment of the liquid crystal | very good | very good | very good |
| B*max (maximum bias at a pulse width of 50 μs) | ~4 | ~5 | — (no window present, so not multiplexable) |
| Twist states | none | none | form |
| M2 | | | |
| Effective tilt angle $\theta$eff (Chevron structure) | 11° | 11° | 8.5–9° |
| Alignment of the liquid crystal | very good | very good | very good |
| B*max (maximum bias at a pulse width of 50 μs) | ~5 | ~7 | ~4 |
| Twist states | none | none | form |

*Maximum possible ratio between switching pulse height and data pulse height for matrix addressing using the quasi-bookshelf structure.

TABLE 4

| | Characterization of the novel alignment layer | | |
|---|---|---|---|
| | Alignment layer P4 | Alignment layer P4 + Z1 | Reference example |
| M1 | | | |
| Effective tilt angle $\theta$eff (chevron structure) | 10° | 10.5° | 7° |
| Alignment of the liquid crystal | very good | very good | very good |
| B*max (maximum bias at a pulse width of 50 μs) | ~4 | ~5 | — (no window present, so not multiplexable) |
| Twist states | none | none | form |
| M2 | | | |
| Effective tilt angle $\theta$eff (Chevron structure) | 11° | 11° | 8.5–9° |
| Alignment of the liquid crystal | very good | very good | very good |
| B*max (maximum bias at a pulse width of 50 μs) | ~5 | ~7 | ~4 |
| Twist states | none | none | form |

*Maximum possible ratio between switching pulse height and data pulse height for matrix addressing using the quasi-bookshelf structure.

TABLE 5

| | Characterization of the novel alignment layer | | |
|---|---|---|---|
| | Alignment layer P5 | Alignment layer P5 + Z1 | Reference example |
| M1 | | | |
| Effective tilt angle $\theta$eff (chevron structure) | 9.5° | 10° | 7° |
| Alignment of the liquid crystal | very good | very good | very good |
| B*max (maximum bias at a pulse width of 50 μs) | ~4 | ~5 | — (no window present, so not multiplexable) |
| Twist states | none | none | form |
| M2 | | | |
| Effective tilt angle $\theta$eff (Chevron structure) | 11° | 11° | 8.5–9° |
| Alignment of the liquid crystal | very good | very good | very good |
| B*max (maximum bias at a pulse width of 50 μs) | ~5 | ~7 | ~4 |
| Twist states | none | none | form |

*Maximum possible ratio between switching pulse height and data pulse height for matrix addressing using the quasi-bookshelf structure.

TABLE 6

| | Characterization of the novel alignment layer | | |
|---|---|---|---|
| | Alignment layer P6 | Alignment layer P6 + Z1 | Reference example |
| M1 | | | |
| Effective tilt angle θeff (chevron structure) | 10° | 10.5° | 7° |
| Alignment of the liquid crystal | very good | very good | very good |
| B*max (maximum bias at a pulse width of 50 μs) | ~4 | ~5 | — (no window present, so not multiplexable) |
| Twist states | none | none | form |
| M2 | | | |
| Effective tilt angle θeff (chevron structure) | 11° | 11° | 8.5–9° |
| Alignment of the liquid crystal | very good | very good | very good |
| B*max (maximum bias at a pulse width of 50 μs) | ~5 | ~7 | ~4 |
| Twist states | none | none | form |

*Maximum possible ratio between switching pulse height and data pulse height for matrix addressing using the quasi-bookshelf structure.

TABLE 7

| | Results of Examples 34 and 35 | | | | | |
|---|---|---|---|---|---|---|
| M3 | Alignment layer P1 + Z1 | | | Polyvinyl alcohol + Z1 | | |
| Temperature | 30° C. | 40° C. | 50° C. | 30° C. | 40° C. | 50° C. |
| Cr$_{man}$ | 85 | 90 | 90 | 35 | 65 | 60 |
| Cr$_{dyn}$ | 80 | 80 | 80 | 40 | 60 | 55 |
| Transmission (bright) | 90 | 90 | 90 | 80 | 75 | 90 |
| Transmission (dark) | 1.06 | 1.00 | 1.00 | 2.29 | 1.08 | 1.50 |

We claim:

1. An alignment layer for liquid crystal displays, which comprises a polymer containing maleimide units of the formula I

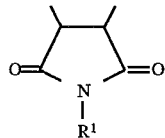

in which

R$^1$ is hydrogen, an acyclic or cyclic, aliphatic, aromatic or araliphatic radical which is chiral or achiral, can be monosubstituted or polysubstituted by functional groups and in which one or more CH$_2$ groups can be replaced by functional groups.

2. The alignment layer as claimed in claim 1, wherein R$^1$ is hydrogen, an aromatic, aliphatic or araliphatic ring having 6 to 24 carbon atoms or a branched or unbranched aliphatic radical having 1 to 40 carbon atoms, which may also contain chiral centers, in which one or more hydrogen atoms, independently of one another, may be replaced by —OH, —F, —Cl, —Br, —CN, —NR$^2$R$^3$, —COOR$^2$, —OR$^2$, —OSi(CH$_3$)$_3$, —SiR$^2$$_2$R$^3$, —Si(OR$^3$)$_2$OR$^3$, —Si(OR$^2$)$_2$R$^3$ or —OOC—NR$^2$R$^3$, where R$^2$ and R$^3$, independently of one another, are hydrogen or an alkyl radical having 1 to 6 carbon atoms, and in which one or more CH$_2$ groups may be replaced by —O—, —SO$_2$—, —CO—, —CONR$^2$—, —CH=CH— or —C≡C—.

3. The alignment layer as claimed in claim 2 wherein R$^1$ is hydrogen, a branched or unbranched alkyl radical having 1 to 20 carbon atoms in which one CH$_2$ group may be replaced by —O— or —CO—, and in which one or more hydrogen atoms may be replaced by fluorine, or is —CH(CH$_3$)—CH$_2$—(O—CH$_2$—CH$_2$)$_n$X, —CH$_2$—CH$_2$—(O—CH$_2$—CH$_2$)$_n$X,—CH$_2$(CH$_3$)—CH$_2$—(O—CH$_2$—CH(CH$_3$)—)$_n$X or —CH$_2$—CH$_2$(O—CH$_2$—CH(CH$_3$)—)$_n$X, where n=1 to 10 and X=NH$_2$ or OH, or the

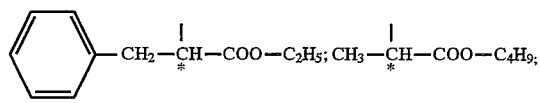

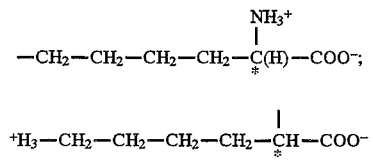

groups.

4. The alignment layer as claimed in claim 1 wherein the radical R$^1$ is a zwitterionic group.

5. The alignment layer as claimed in claim 1 comprising a copolymer or higher polymer comprising maleimide units of the formula I and units derived from polymerizable, ethylenically unsaturated compounds of the formula II

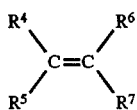   II in which

R⁴ and R⁷ are hydrogen, or aliphatic and/or aromatic radicals which may be monosubstituted or polysubstituted by functional groups.

6. The alignment layer as claimed in claim 6, wherein $R^4$ to $R^7$ are hydrogen, an aromatic radical having 6 to 10 carbon atoms or a branched or unbranched alkyl group having 1 to 10 carbon atoms in which one or more nonadjacent $CH_2$ groups may be replaced by —O—, —OOC—, —COO—, —Si(CH₃)₂— or —O—CONR⁸—, and one or more H atoms may be replaced by —OH, —Cl, —Br, —NO₂, —CN, —COOR⁹, —OR¹⁰, —O—Si(CH₃)₃ or —O—COR¹¹R¹², where $R^8$, $R^9$, $R^{10}$, $R^{11}$ and $R^{12}$ are hydrogen or an alkyl radical having 1 to 5 carbon atoms.

7. The alignment layer as claimed in claim 1, wherein the polymer comprising maleimide units of the formula (I) has been rendered amphiphilic.

8. A liquid crystal display comprising a liquid crystal layer which is enclosed on both sides by layers which are in this sequence starting from the liquid-crystal layer at least one alignment layer, electrodes and a limiting plate, comprising an alignment layer as claimed in claim 1.

9. The liquid crystal display as claimed in claim 8, wherein the liquid crystal layer is ferroelectric.

10. The liquid crystal display as claimed in claim 8, which is operated at a temperature from 30° to 70° C.

* * * * *